(12) United States Patent
George et al.

(10) Patent No.: US 11,213,168 B2
(45) Date of Patent: Jan. 4, 2022

(54) CHARCOAL GRILL ACCESSORY FOR GAS GRILLS

(71) Applicants: Andrew Martin George, Boise, ID (US); Duane Clair Shattuck, Eagle, ID (US)

(72) Inventors: Andrew Martin George, Boise, ID (US); Duane Clair Shattuck, Eagle, ID (US)

( * ) Notice: Subject to any disclaimer, the term of this patent is extended or adjusted under 35 U.S.C. 154(b) by 203 days.

(21) Appl. No.: 16/508,222

(22) Filed: Jul. 10, 2019

(65) Prior Publication Data

US 2020/0229642 A1    Jul. 23, 2020

Related U.S. Application Data

(60) Provisional application No. 62/794,648, filed on Jan. 20, 2019.

(51) Int. Cl.
*A47J 37/07*    (2006.01)
*A23L 5/10*    (2016.01)

(52) U.S. Cl.
CPC .............. *A47J 37/079* (2013.01); *A23L 5/15* (2016.08); *A47J 37/0713* (2013.01); *A23V 2002/00* (2013.01)

(58) Field of Classification Search
CPC ........................ A47J 37/079; A47J 37/0786
See application file for complete search history.

(56) References Cited

U.S. PATENT DOCUMENTS

| | | | |
|---|---|---|---|
| 3,247,827 A | 4/1966 | Cremer | |
| 4,706,643 A | 11/1987 | Tyson | |
| 4,819,614 A | 4/1989 | Hitch | |
| 5,242,703 A | 9/1993 | Strewart | |
| 5,878,739 A | 3/1999 | Guidry | |
| 6,000,389 A * | 12/1999 | Alpert | A47J 37/0713 126/25 R |
| 6,640,800 B1 | 11/2003 | Hodgson et al. | |
| 8,201,550 B2 | 6/2012 | Malumyan | |
| 8,316,837 B2 | 11/2012 | Malumyan | |
| 2003/0177913 A1 | 9/2003 | Dellinger | |

(Continued)

OTHER PUBLICATIONS

Various website products printouts, prior to Jul. 10, 2019.

*Primary Examiner* — Jason Lau
(74) *Attorney, Agent, or Firm* — Pedersen and Company, PLLC; Ken J. Pedersen; Barbara S. Pedersen

(57) ABSTRACT

A device utilizes charcoal for cooking food, and is adapted for lighting the charcoal by placement on a conventional gas grill. The device includes a food-receiving plate/grill, a charcoal platform, and an ash platform/tray. The device is adapted so that, with the ash tray removed and the device resting on the gas grill, heat from the gas flames ignites the charcoal resting on the charcoal platform. Upon the ignition of the charcoal, the gas grill may be turned off, the ash tray may be inserted into the device underneath the charcoal platform to catch the charcoal ash, and the device may remain on the gas grill or be moved to another table/surface as the charcoal-only cooking proceeds. The charcoal platform may be stationary in one location, or movable to multiple locations, between the bottom extremity of the device and the food-receiving grill member(s) at the top of the device.

15 Claims, 23 Drawing Sheets

(56) References Cited

U.S. PATENT DOCUMENTS

| | | | |
|---|---|---|---|
| 2004/0112226 A1* | 6/2004 | Johnston | A47J 37/0713 99/339 |
| 2012/0247448 A1* | 10/2012 | Thibodeaux | A47J 37/0713 126/25 R |
| 2015/0305559 A1* | 10/2015 | Chung | A47J 37/0713 126/25 R |

* cited by examiner

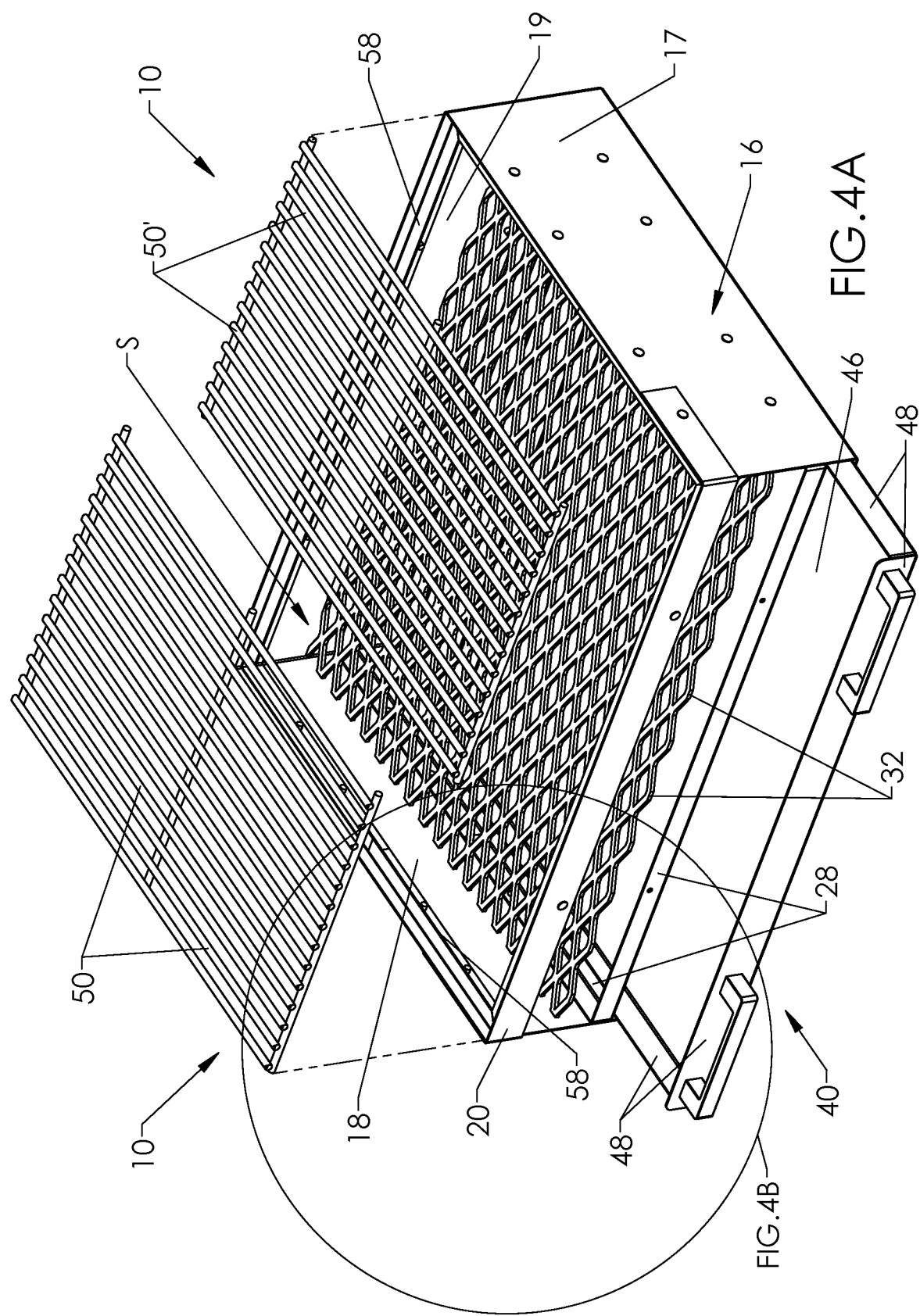

CHARCOAL GRILL ACCESSORY FOR GAS GRILLS

This application claims benefit of Provisional Application Ser. No. 62/794,648, filed Jan. 20, 2019 and entitled Charcoal Grill Accessory for Gas Grills, which application is incorporated herein in its entirety by this reference.

BACKGROUND OF THE INVENTION

Field of the Invention

The invention relates generally to a food grilling device. More specifically, the invention relates to a device for grilling food with charcoal after a gas grill is used to ignite the charcoal.

SUMMARY OF THE INVENTION

The invention comprises a device that utilizes charcoal for cooking food, and that is adapted for lighting the charcoal by placement of the device on a conventional gas grill. The device comprises a food-receiving plate/grill, a charcoal platform, and a removable ash platform for catching charcoal ashes. The device comprises one or more adaptations that, when the ash platform is removed and the device is resting on the gas grill, allow heat from the gas grill flames to ignite the charcoal resting on the charcoal platform. Said adaptation(s) include the main body being substantially open at its bottom end, for example, 80-99 percent open and more preferably 90-99 percent open. Further, the bottom opening of the main body is preferably the same or substantially the same width and depth as the charcoal platform. This way, with the ash platform removed from the main body, there is very little or no main body structure that blocks heat convection H, so that heated air/gasses can flow freely and directly up from the gas grill into the interior space to reach the entire or substantially the entire charcoal platform. Upon the ignition of the charcoal, the gas grill may be turned off, the ash platform may be inserted into the device underneath the charcoal platform to catch the charcoal ash, and the device may remain on the gas grill or be moved to another table/surface as the charcoal-only cooking proceeds.

Certain embodiments of the device are adapted so that the charcoal platform is stationary in a location between the bottom extremity of the device and the food-receiving grill member(s) at the top of the device, in which location the charcoal both 1) can be ignited by the gas grill flames/heat when the ash platform is removed from the device, and 2) can cook food placed on the top grill member(s) of the device. Certain other embodiments of the device are adapted so that the charcoal platform is moveable to adjust the charcoal platform to multiple different locations between the bottom extremity of the device and the food-receiving grill member(s) at the top of the device, as desired for charcoal-ignition efficiency/preference and/or cooking efficiency/preference.

Preferred embodiments and methods of using the device feature effective charcoal ignition and charcoal-only grilling, without chemical flame accelerants, by methods that preserve the traditional and desirable charcoal-grilling flavor. Preferred embodiments, when used with a gas grill, are set on top of the cooking surface/grate of the gas grill, to be above rather than below or beside said cooking surface/grate, and rather than being installed between the cooking surface/grate and the flavor bars or gas burners. In alternative uses, the device may be used independently of, and separately from, a gas grill, by starting the charcoal by conventional charcoal igniting methods and resting the device on a table or other surface.

BRIEF DESCRIPTION OF THE DRAWINGS

FIG. 4A is a partially-exploded, right-front perspective view of the device of FIG. 1, wherein the ash platform, for example an ash tray with upending perimeter rim in this embodiment, is slid out part-way from the main body of the device.

DESCRIPTION OF THE PREFERRED EMBODIMENTS

Figure 1:
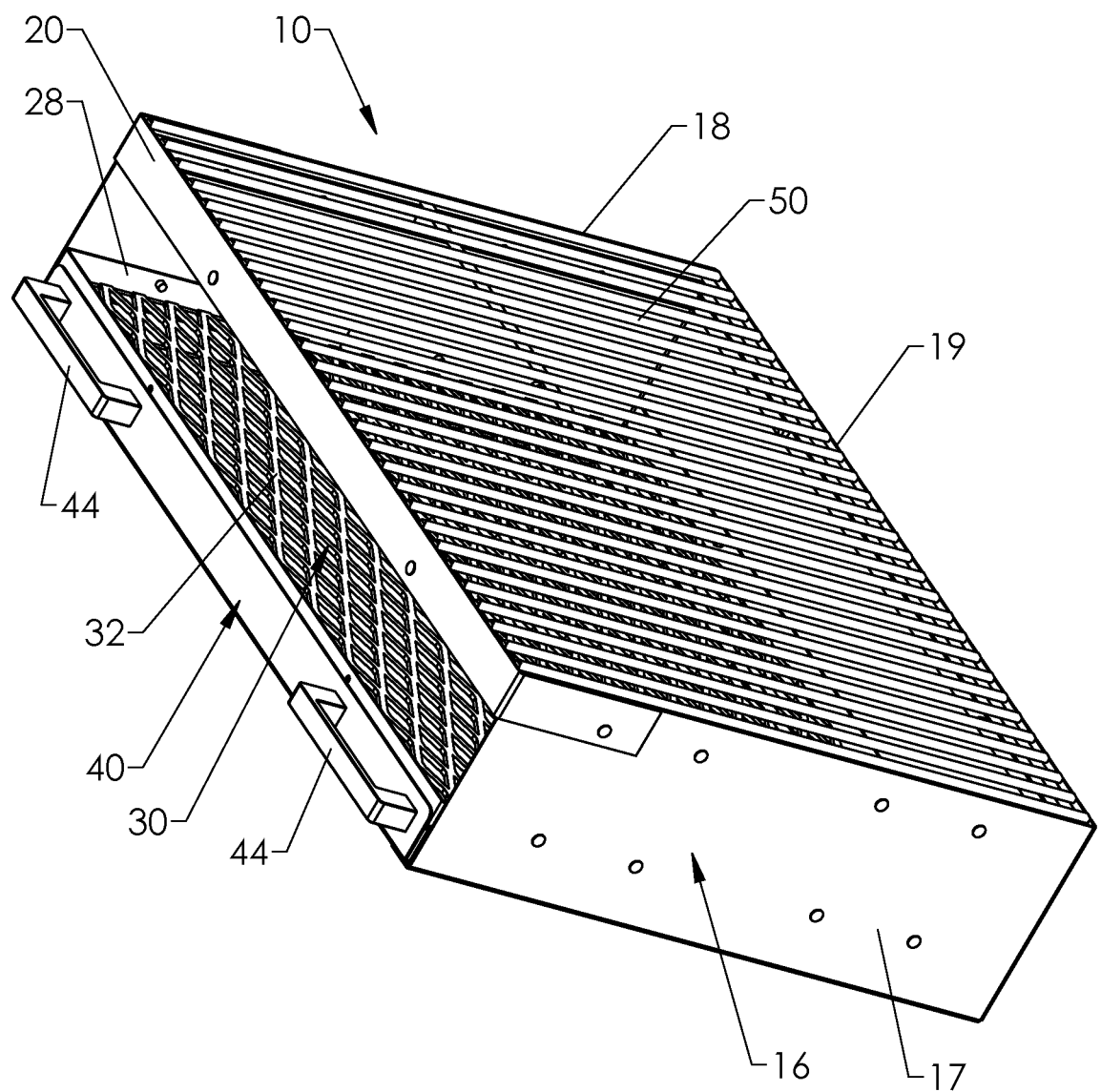
FIG. 1 is a right side perspective view of a first embodiment of the charcoal grill device.
Figure 2:
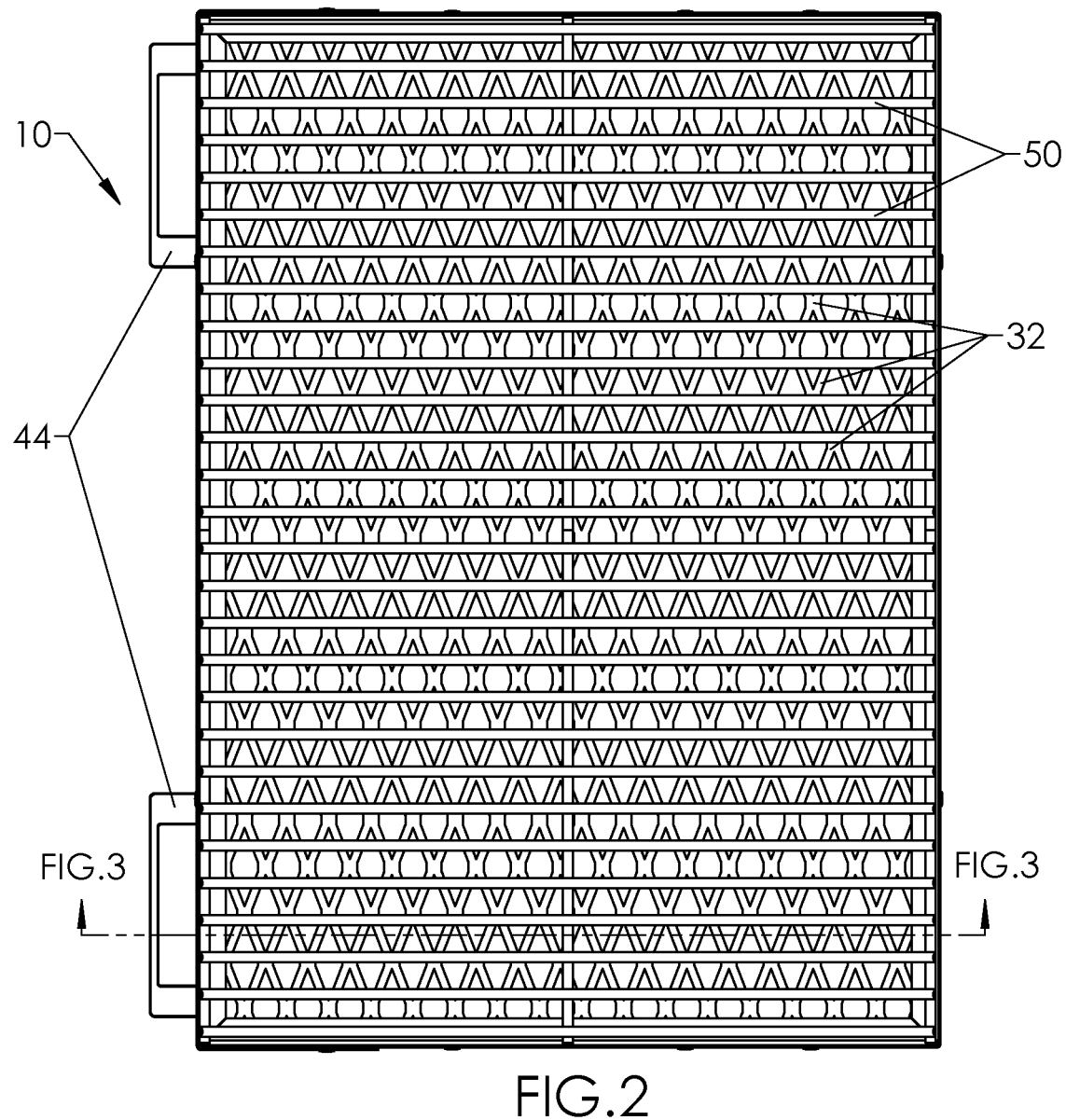
FIG. 2 is a top view of the device of FIG. 1.

Referring to the Figures, there are shown multiple, but not the only, embodiments of the invented charcoal grill accessory for use with gas grills. FIGS. 1-12 portray a first embodiment of the device having a fixed-location charcoal platform for holding charcoal, and having an ash platform support system that serves also as the device's bottom base for resting on the gas grill, table or other surface. FIGS. 13-24 portray a second embodiment having a moveable charcoal platform that may be installed at multiple levels between the ash platform and the cooking surface of the device, and having an ash platform support system that is spaced slightly upward from the bottom base of the device, thus providing extra room for insertion and/or removal of the ash platform when the device is on the gas grill, and creating an air space between the ash platform and the bottom base that distances, and insulates, the potentially-hot ash platform from a table or surface for added safety.

Preferred embodiments of the device may be used with most conventional gas grills, for example, those using natural gas or propane as fuel, making the device a universal or nearly-universal accessory for many commercially-available gas grills. Certain embodiments of the device are 2 feet wide from right to left, about 18 inches deep from front to rear, and 5.5-7 inches high from top to bottom, and fit well on many conventional grills including when the grill lid is closed. It should be noted that the dimensions and distances given below for devices 10 and 100 are illustrative of certain embodiments and are not required for all embodiments. The device may be shaped and/or scaled-down for non-rectangular gas grills and/or smaller gas grills, if desired. Preferred embodiments are made entirely of rigid or substantially rigid metal, for durability, heat resistance, and safety during use, and may be assembled by various manufacturing techniques, including welding, riveting and/or other fasteners.

LISTING OF REFERENCE NUMBERS, FIRST EMBODIMENT OF FIGS. 1-12

Grilling Device 10; Main body 16 with bottom opening OB into interior space S, the bottom opening OB for allowing heat H to flow into the interior space S; Main body right sidewall 17, left sidewall 18, rear sidewall 19, and front sidewall/reinforcement 20; Main body base 22; Charcoal platform 30, for holding charcoal CH, including 1) stationary charcoal platform support system 28 to support/retain the grate 32, for example, including L-shaped brackets/portions having vertical arms 28V, 28V' and horizontal arms 28H; Movable/slidable ash platform, which in this embodiment is ash tray 40 for catching charcoal ashes CA, with handles 44, bottom tray plate 46 and upending rim 48 on all four sides of tray plate 46, wherein the ash tray support system comprises strips/feet of main body base 22 extending along the bottom right, left and rear of main body 16; Cooking grill member(s) 50, 50', for supporting food F on multiple food bars FB, and the cooking grill member(s) 50, 50' being supported by stationary grill support system 58; Gas grill G, comprising gas grill top (also, gas grill grate) GT having multiple gas grill bars GB, gas grill controls GC, and lid L; and Rivets R.

LISTING OF REFERENCE NUMBERS, SECOND EMBODIMENT OF FIGS. 13-24

Grilling Device 100: Main body 116 with bottom opening OB into interior space S, the bottom opening OB for allowing heat H to flow into the interior space S; Main body right and left sidewalls 117, 118 and rear sidewall 119; Main body front sidewall/reinforcement 120; Main body base 122 including a front strip/foot 122'; Movable/slidable charcoal platform 130, including an open-bottomed charcoal platform frame 131 holding grate 132 and having handles 134; Multiple charcoal platform support systems 128 at different levels A and B for moveably/slidably receiving the charcoal platform 130; Moveable/slidable ash platform that in this embodiment is ash tray 140, with handles 144, bottom tray plate 146 and upending rim 148 around all four sides of plate 146; Ash tray support system 168 for movably/slidably receiving the ash tray 140; Cooking grill member(s) 150 comprising multiple food bars FB for supporting food F being cooked via charcoal CH, the cooking grill member(s) 150 being supported by stationary grill support system 158. Detailed Description of Charcoal Grill Accessory Device 10:

FIG. 1-12 illustrate a grilling device 10 that comprises a main body 16 comprising a vertical enclosure wall, or "sidewall", defining and extending around or substantially around an interior space S, the sidewall in this embodiment comprising a right sidewall 17, left sidewall 18, rear sidewall 19, and front sidewall/reinforcement 20, forming a rectangular enclosure for supporting and cooperating with other elements of the device, as described below. Device 10 shapes other than rectangular are envisioned by the inventors, for example square or oval, but a rectangular shape is considered efficient and effective for cooperation with most conventional grills that also are rectangular or generally rectangular.

An important adaptation of the main body 16 is that it is substantially open at its bottom end, for example, 80-99 percent open, more preferably 90-99 percent open, and most preferably 95-99 percent open. In other words, the bottom opening OB extends 80-99 percent, more preferably 90-99 percent, and most preferably 95-99 percent, across the width and depth of the bottom end of the main body. When the ash platform is removed from the main body, the bottom opening OB allows all or substantially all of the interior space S inside the main body to be in fluid communication with any heat, air, or gas flow from below the main body, without structure that significantly blocks heat convection H, that is, that significantly blocks heated air/gasses from flowing directly up from the gas grill into the interior space to reach the charcoal platform.

The front of the main body 16 is preferably substantially open, for example, 80-99 percent open, but may comprise one or more reinforcements or partial front sidewalls, such as front sidewall/reinforcement 20, that help support and retain grate(s) and/or grill member(s), described later in this document, in their operative locations, and that maintain the desired shape and strength of the main body 16.

Charcoal platform 30, for holding charcoal CH, preferably has a height of about 0.75 inch including the platform frame 31, and is positioned so that the grate 32 of the platform 30 is about 1.75 inches from the bottom plane of the device (typically, the bottom plane of the base 22) that rests on a gas grill or other surface, and about 4 inches from the top plane of the gill member(s) where the food is cooked. The bottom of the charcoal platform 30 is provided in the range of about 1.75 inches above the bottom surface of the body base 22, and is about 0.25 inches above the top of the inserted ash platform/tray 40. The charcoal platform 30 includes a stationary charcoal platform support system 28 or "support shelf", provided at/on the inner surface of each of the right, left and rear sidewalls 17, 18, 19, and also spanning across the front of the main body 16, in effect, extending around the entire perimeter of the interior space of the main body.

Figure 4B:
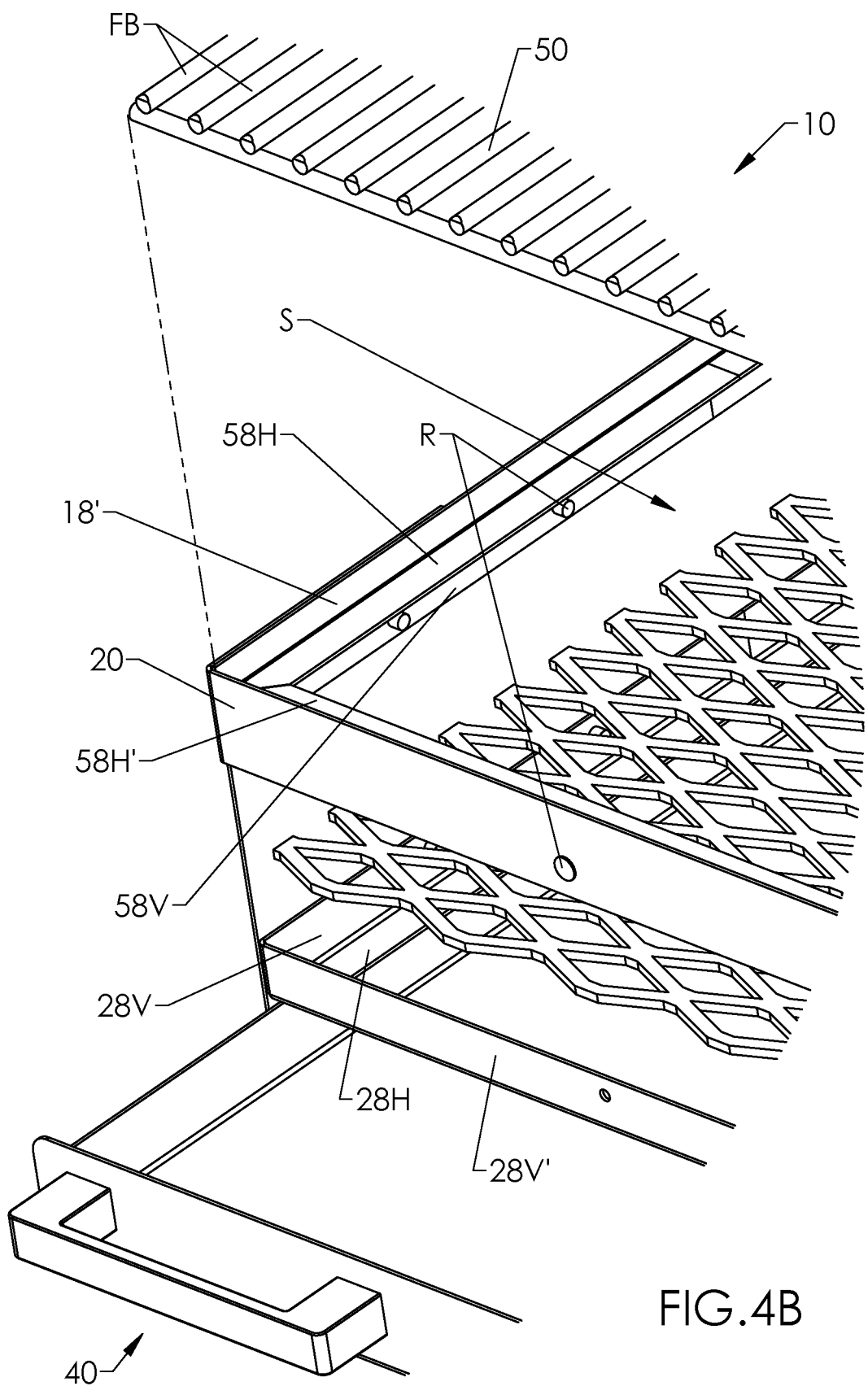
FIG. 4B is an enlarged detail view of the area circled in FIG. 4A.
Figure 5:
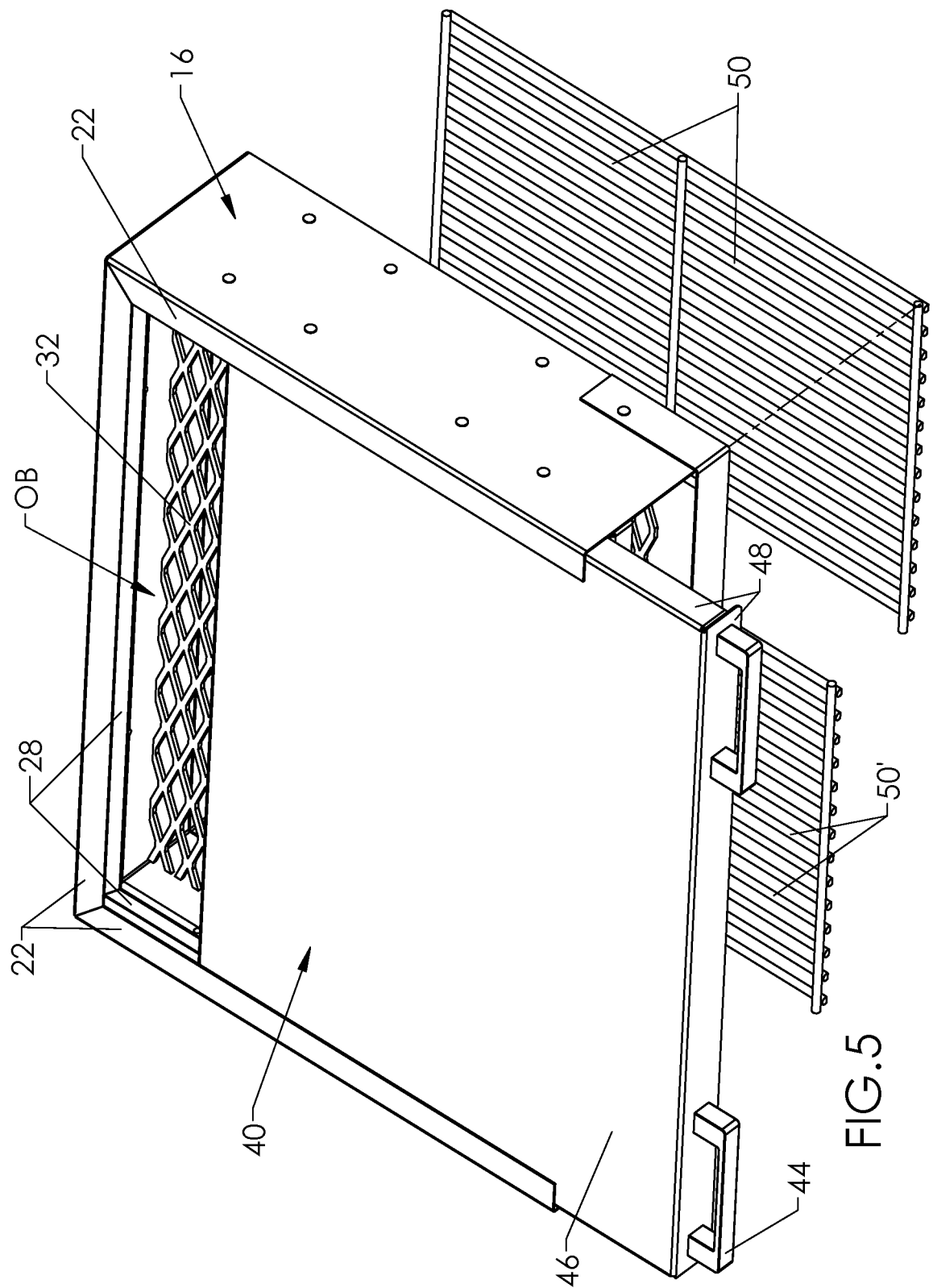
FIG. 5 is a partially-exploded, right-bottom perspective view of the device of FIG. 1, wherein the ash tray is slid out part-way from the main body of the device.
Figure 6:
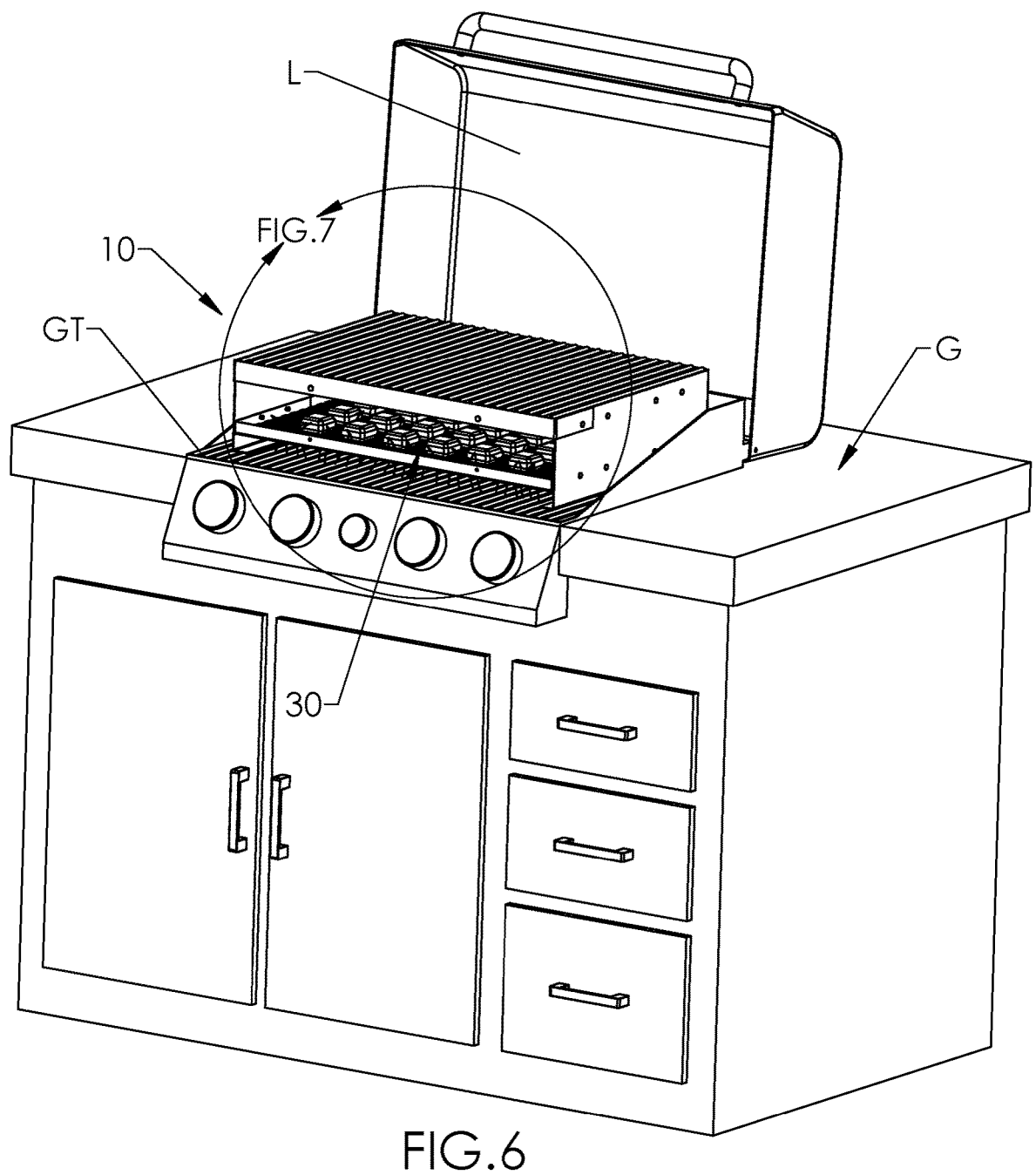
FIG. 6 is a front perspective view of the device of FIG. 1 installed on an exemplary gas grill, with charcoal installed on the charcoal platform and the ash tray removed, the device in use during igniting of the charcoal by use of the gas grill flames/heat.
Figure 7:
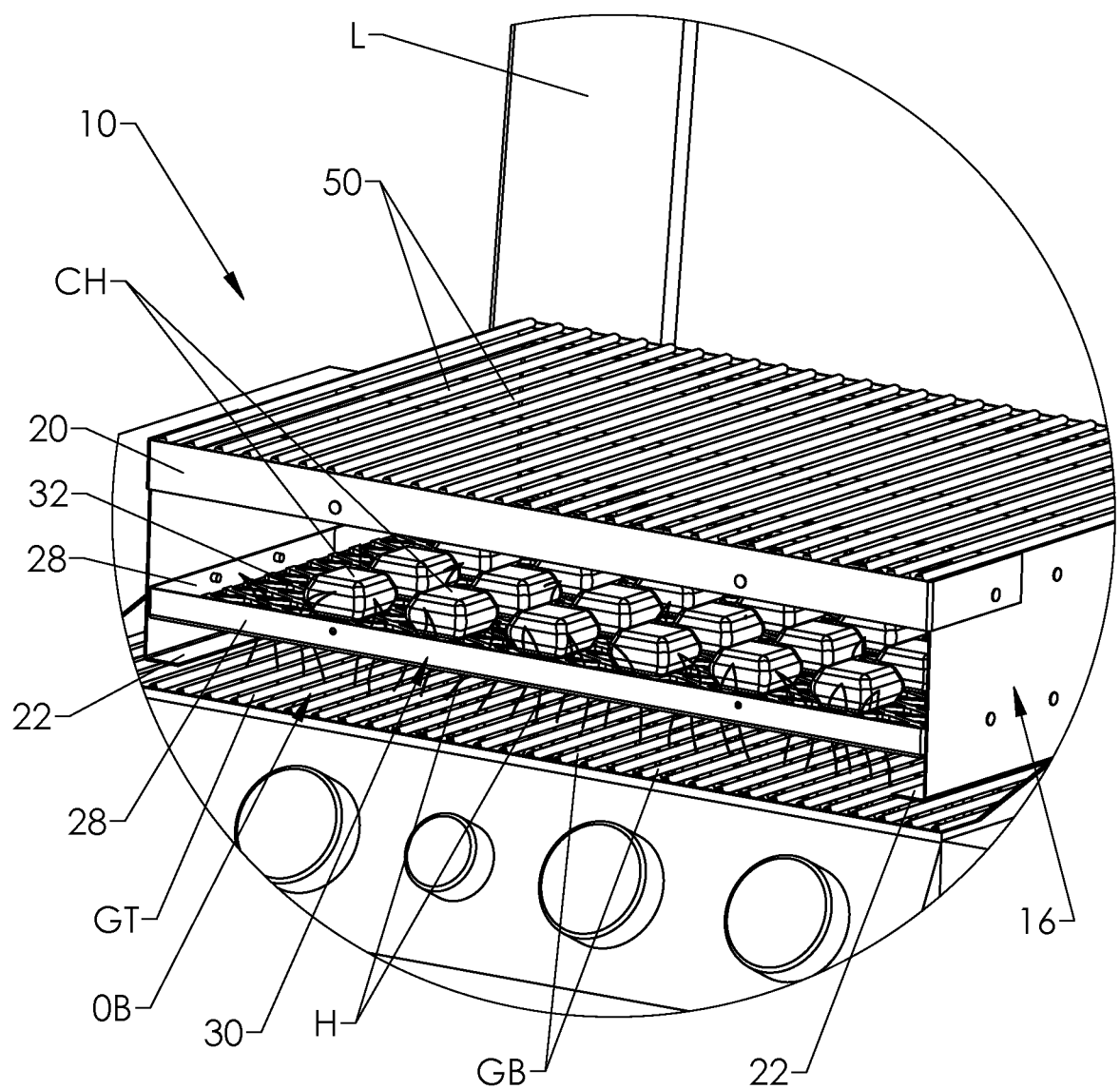
FIG. 7 is an enlarged detail view of the area circled in FIG. 6, showing heat rising from the gas flames to ignite the charcoal.
Figure 8:
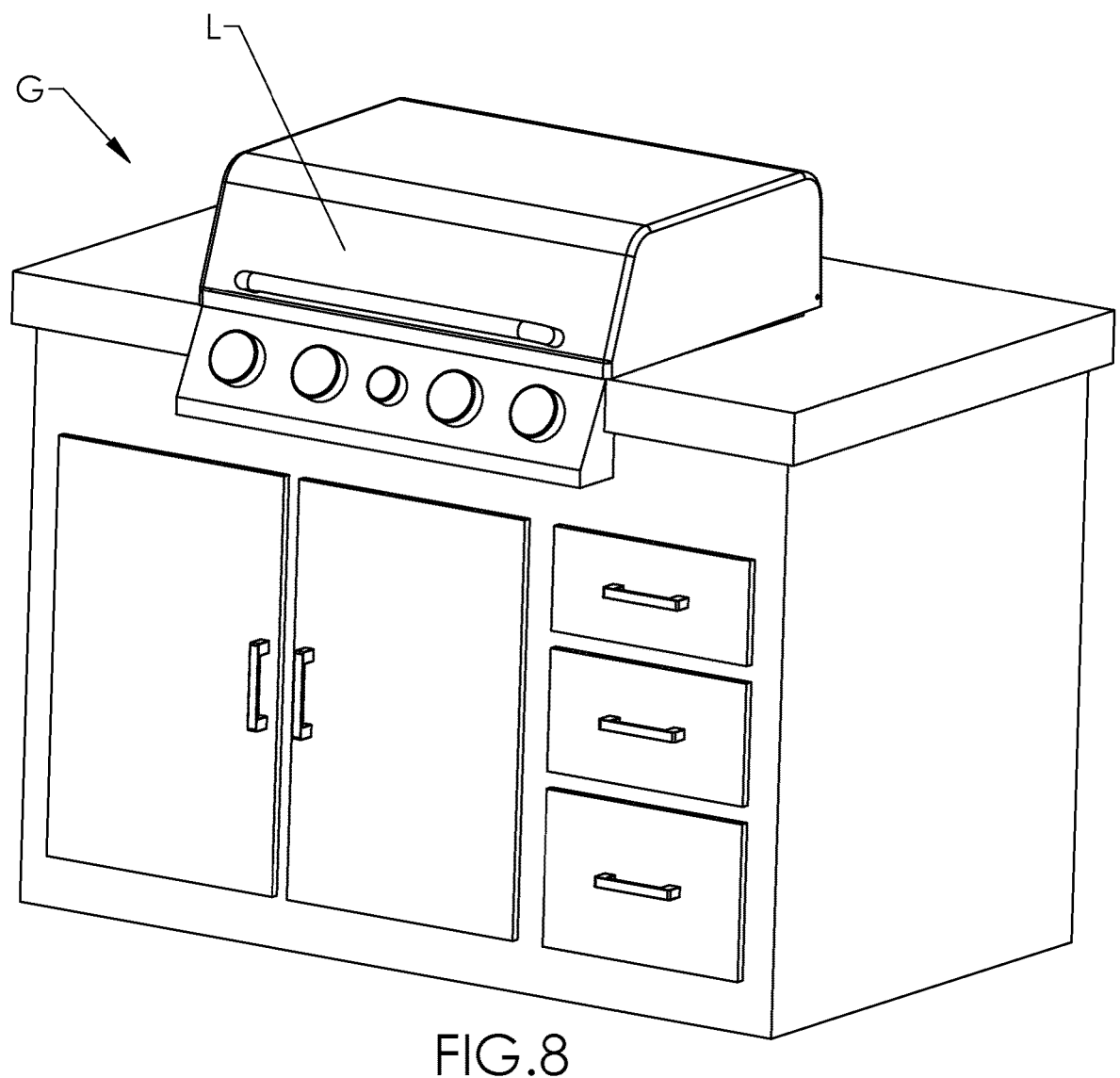
FIG. 8 is a front perspective view, as in FIG. 6, with the gas grill lid closed over the device during ignition of the charcoal by means of the gas grill flames/heat.
Figure 9:
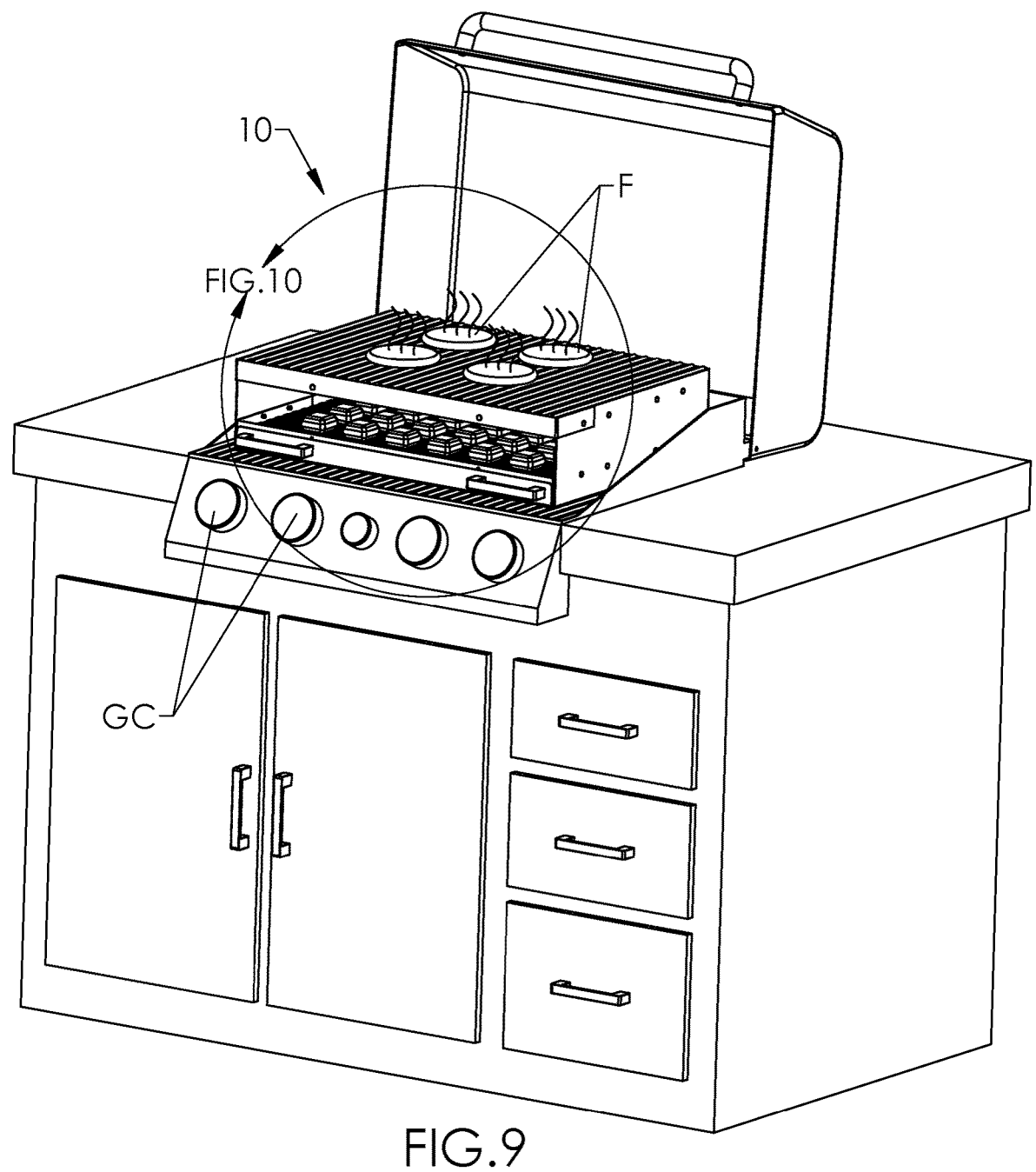
FIG. 9 is a front perspective view of the device and grill of FIG. 6 after ignition of the charcoal, with the gas grill lid opened and the ash tray installed in the device, wherein the device is in use for cooking food by means of the ignited charcoal.
Figure 10:
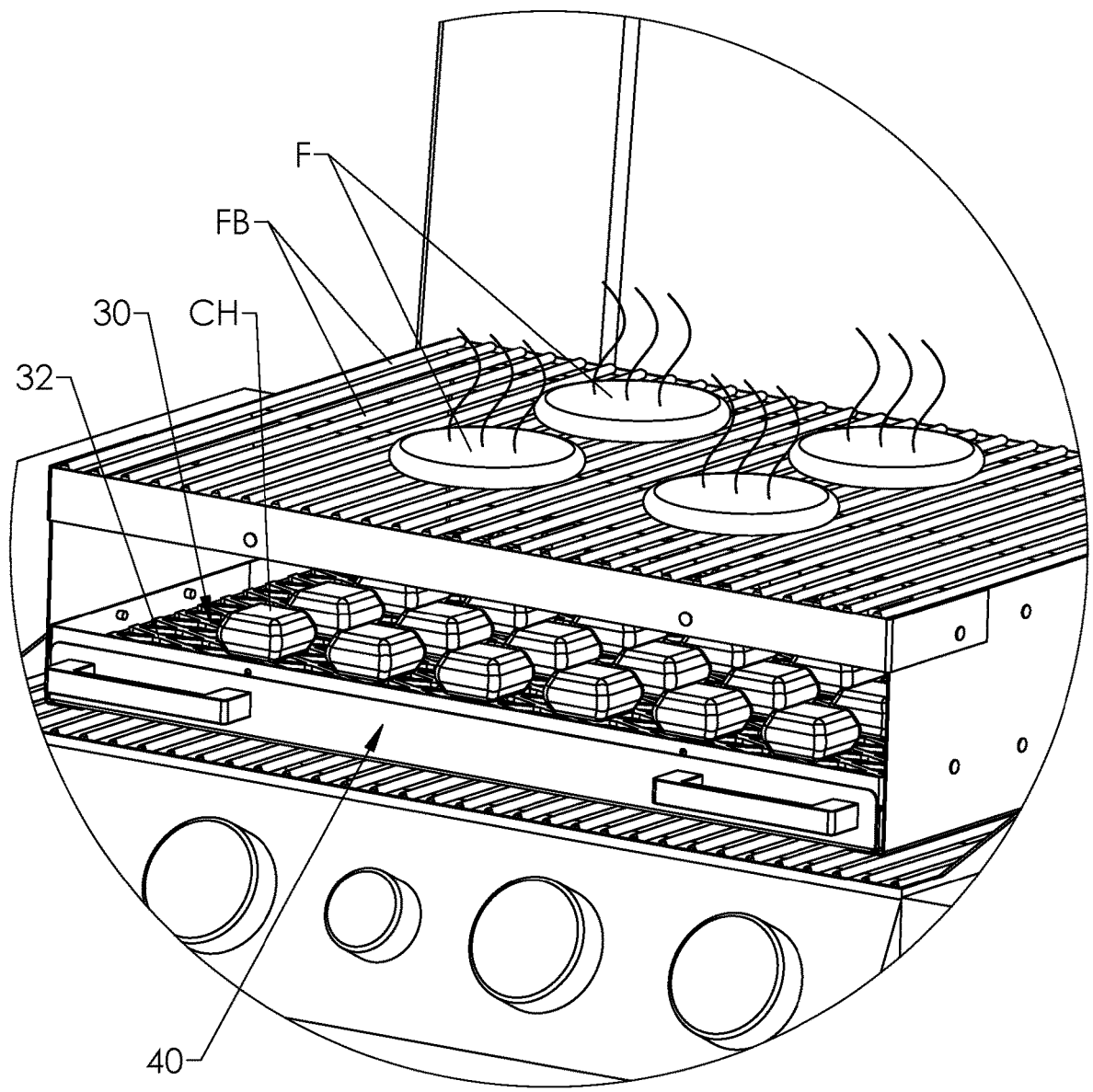
FIG. 10 is an enlarged detail view of the area circled in FIG. 9.
Figure 11:
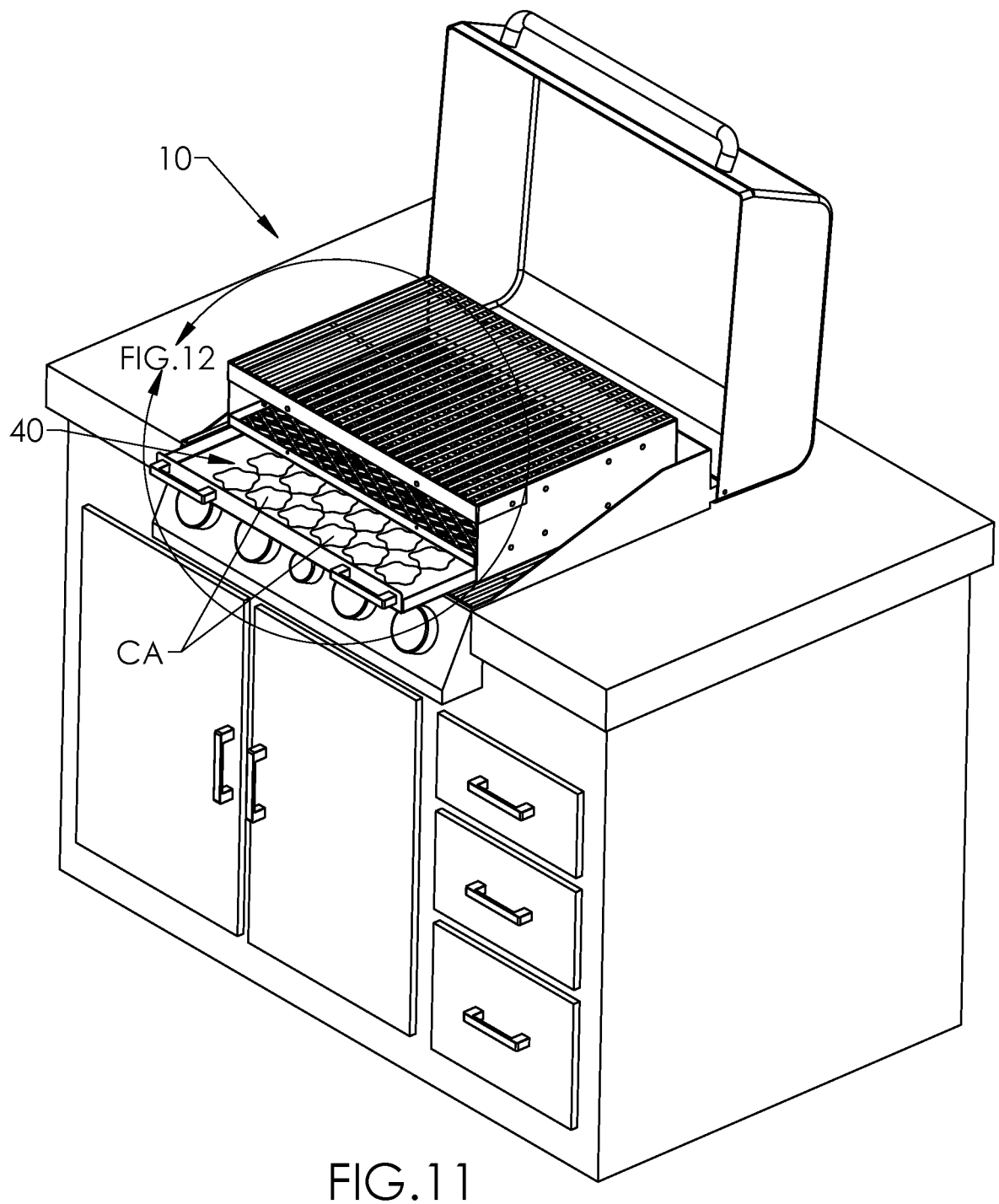
FIG. 11 is a top perspective view of the device and grill of FIG. 9, after cooking, illustrating removal of the ash tray to empty the tray of charcoal ashes.
Figure 12:
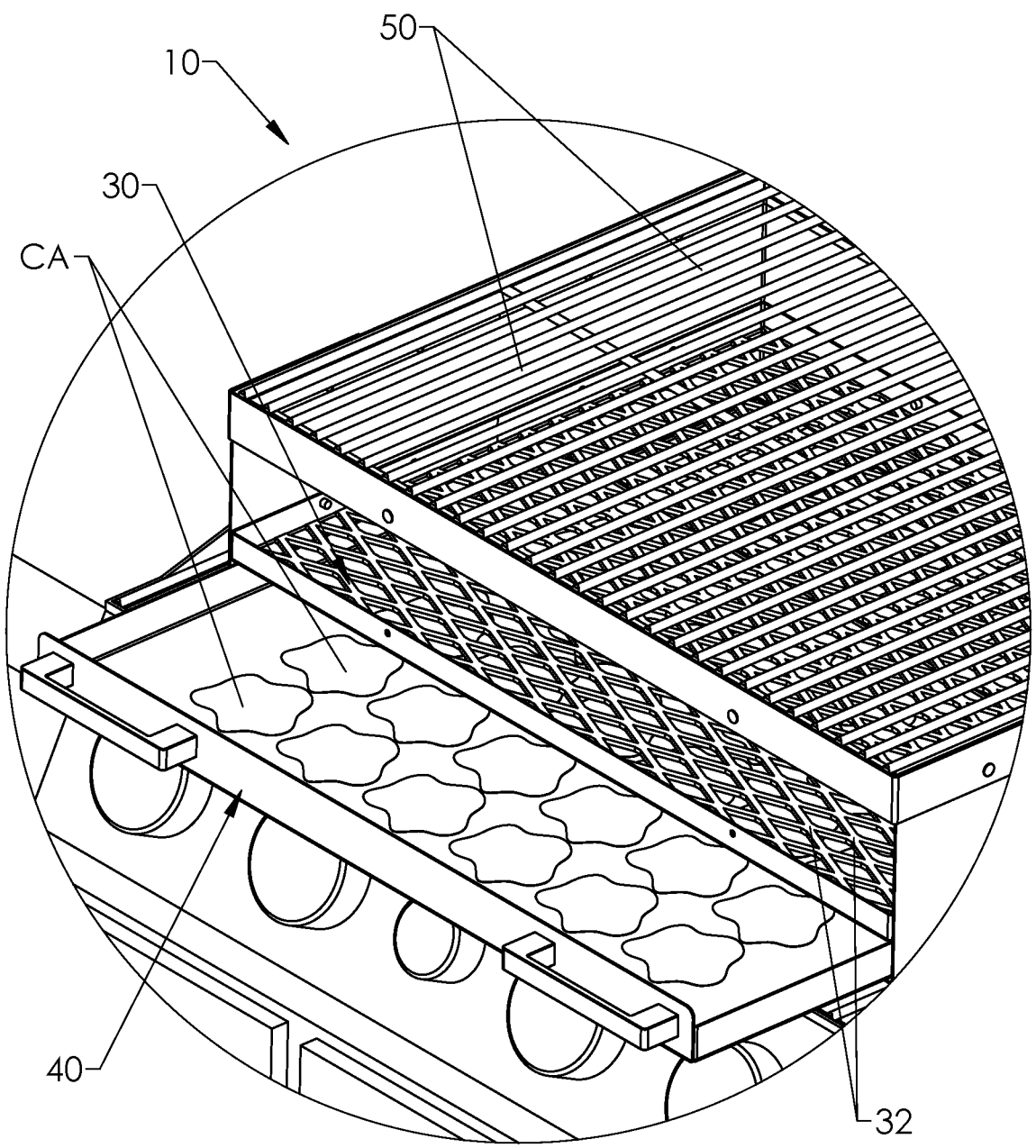
FIG. 12 is an enlarged detail view of the area circled in FIG. 11.
Figure 13:
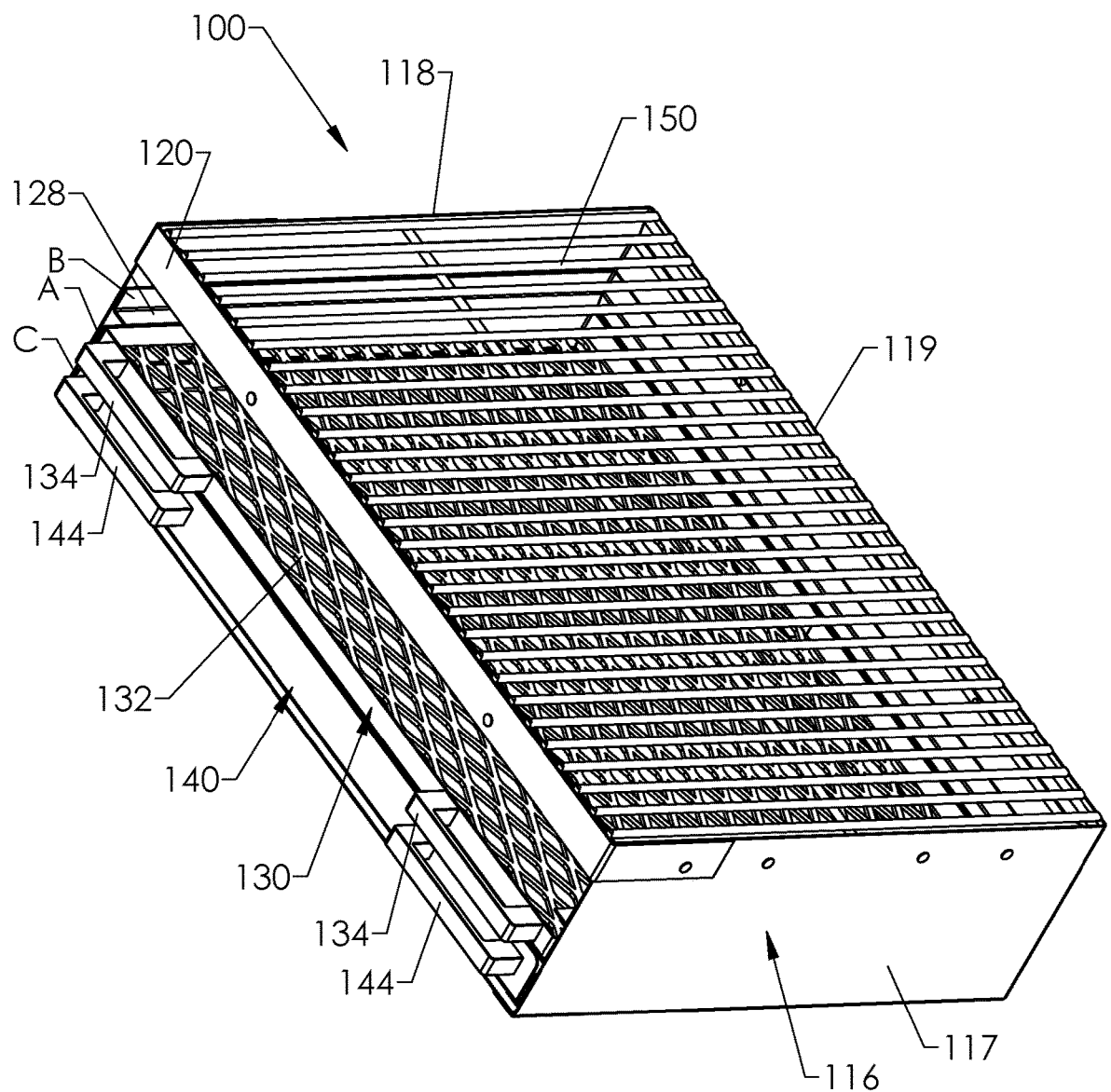
FIG. 13 is a right side perspective view of a second embodiment of the charcoal grill device, with the charcoal platform installed in a lower position, and the ash platform, in this embodiment an ash tray with upending perimeter rim, installed below the charcoal platform.
Figure 14:
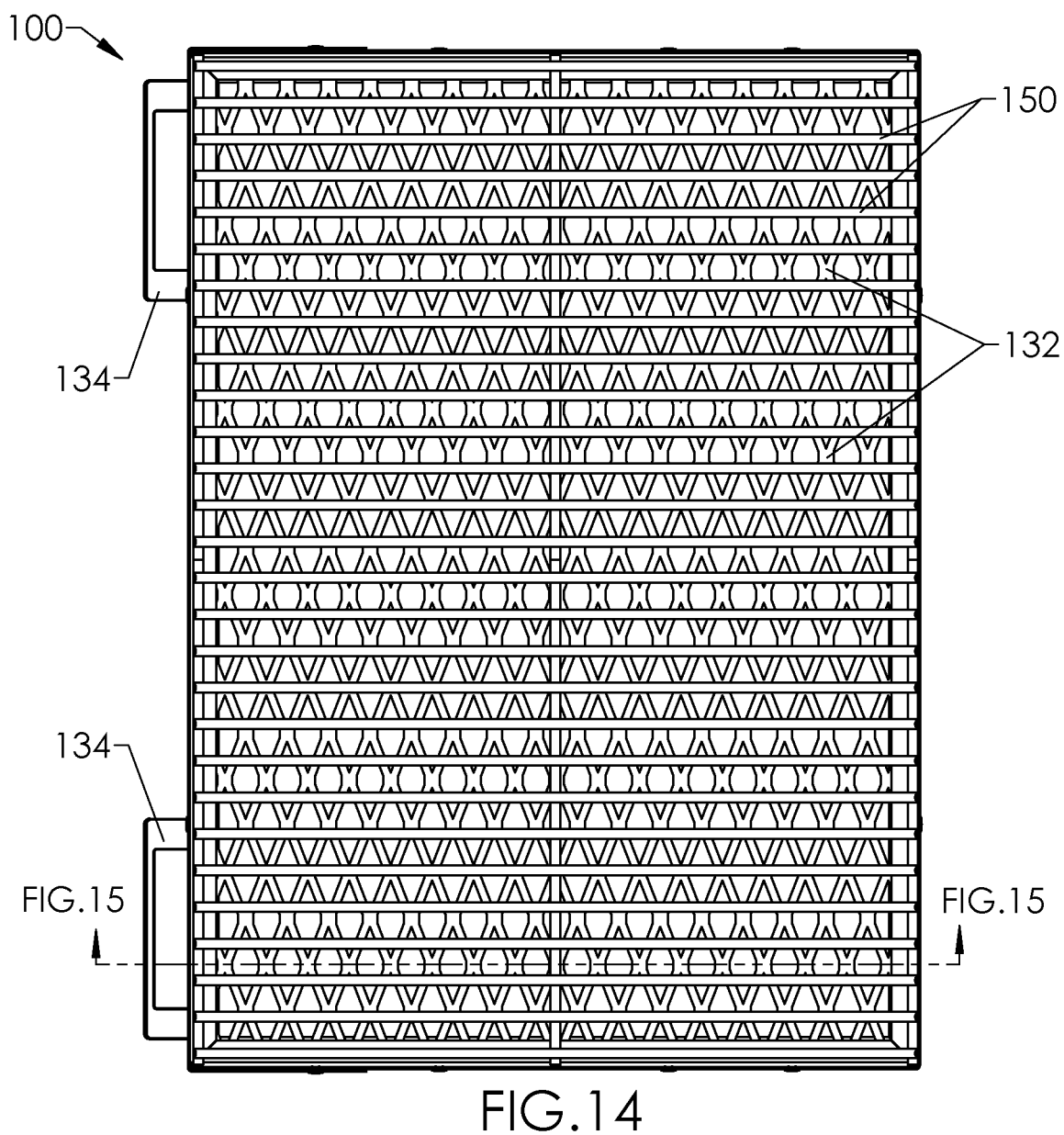
FIG. 14 is a top view of the device of FIG. 13.
Figure 15:
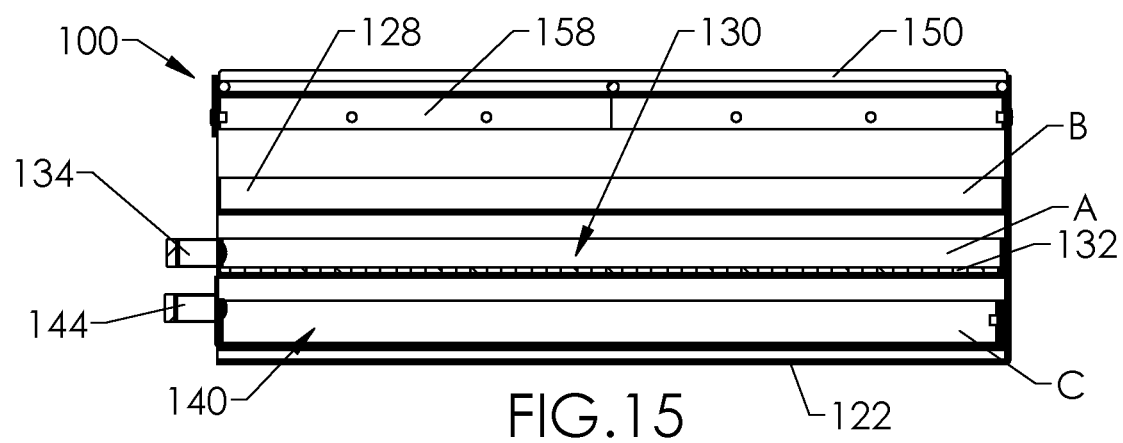
FIG. 15 is a cross-sectional view of the device viewed along the line 15-15 in FIG. 14.
Figure 16:
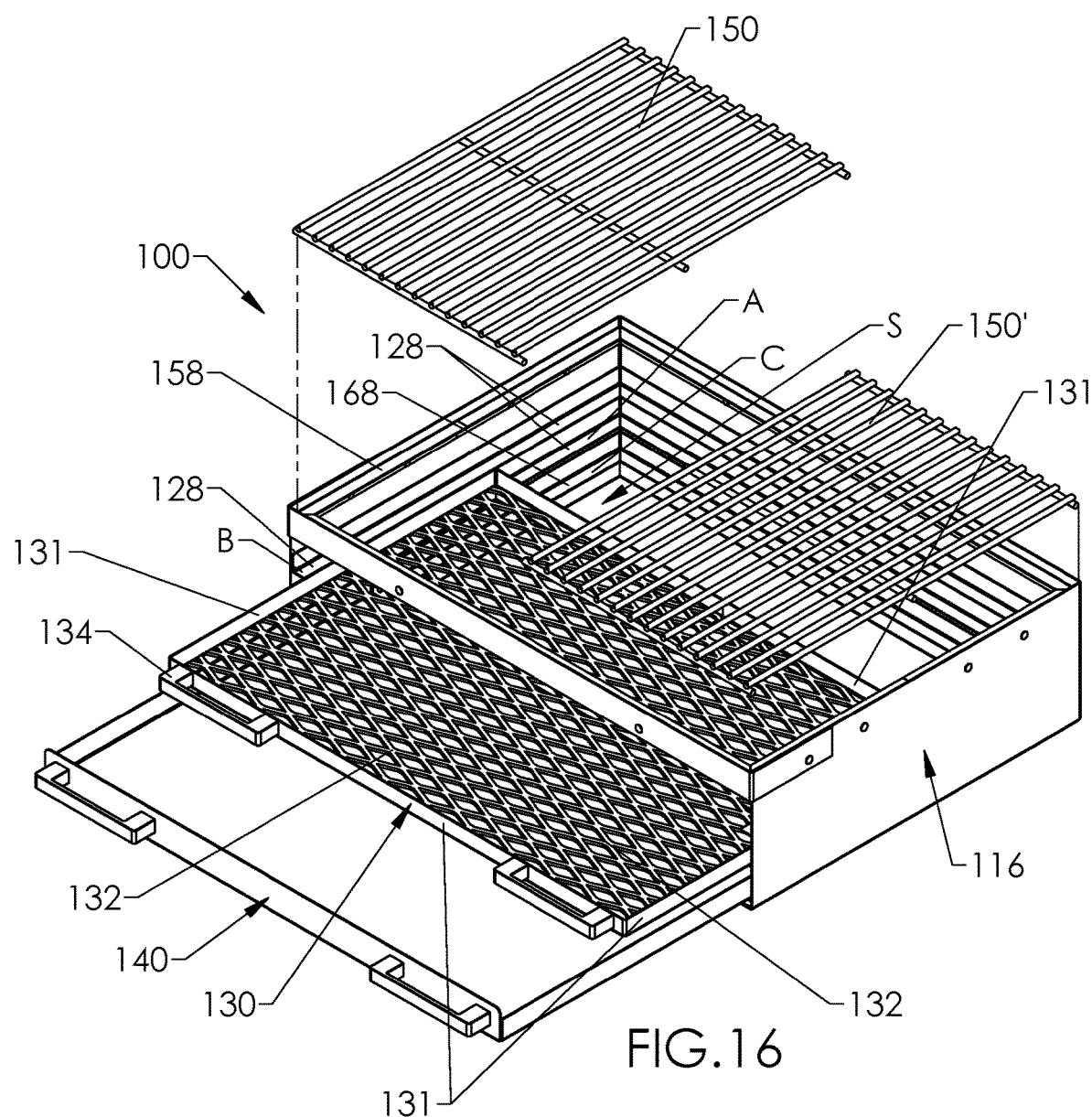
FIG. 16 is a partially-exploded, right-front perspective view of the device of FIG. 13, with the charcoal platform slid part-way out from its position in FIGS. 13-15, and the ash tray slid part-way out from its position in FIGS. 13-15.

The front portion of the support system 28 extends from the right and left portions of the support system 28 and/or from the right and left sidewalls, spanning span across the front side of the main body 16 to support the front edge of the grate 32 and to reinforce/strengthen the main body. The support system/shelf may be various structures and forms that support the grate 32 at the desired level, including structures/forms connected to or integral with the main body and including continuous or discontinuous along one or more sidewalls of the body. One effective embodiment of the support system 28 comprises L-shaped brackets/portions located all around the perimeter of the interior space of the main body. In FIG. 4B, one may see to best advantage the left-sidewall 18 L-shaped bracket/portion, comprising vertical arm 28V fixed to the sidewall 18 and horizontal arm 28H extending underneath the outer perimeter edge of the grate 32. In FIG. 4B, one may also see vertical arm 28V' of the front L-shaped bracket/portion. The vertical arms 28V on the right, left and rear sidewalls 17-19 may be riveted or otherwise fastened to the sidewalls 17-19. As it is not directly fastened to any sidewall, the front L-shaped bracket/portion may be integrally connected to the front ends of the right and left L-shaped bracket/portions. The horizontal arms 28H of the right, left and rear brackets/portions preferably extend horizontally only about 0.5-1 inch from the sidewalls 17, 18, 19, so as to not significantly block the openings/apertures through the grate 32. Likewise, the horizontal arm of the front bracket/portion preferably extends horizontally only about 0.5-1 inch from the front vertical plane of the main body 16, so as to not significantly block the openings/apertures through the grate 32.

Charcoal grate 32 is a rigid/substantially-rigid, generally planar or planar sheet having many apertures, so that most of the sheet open to the top and bottom, for receiving heat from the gas grill for ignition of the charcoal and/or to allow ashes to fall to the ash platform/tray 40 rather than falling into the gas grill and/or onto another table/surface. The grate 32 may be a mesh, grating, screen, and/or other perforated material. Preferably, 80-98 percent of the grate 32 is open for excellent convection of heat from the flames of the gas grill.

Charcoal grate 32 is preferably vertically removable from the support system 28, for easily removing charcoal if any remains on the grate 32, and/or other cleaning or replacement. Therefore, while the support system 28 is preferably fixed and immovable relative to the main body 16, the grate can be lifted up out of the support system 28 for cleaning or maintenance. During use, the grate 32 will normally and effectively stay in place in the support system 28 due to the support system vertical arms and/or the vertical sidewalls, and therefore the grate 32 will not slide forward or in any direction out of the device 10. For example, other support systems may be used that have lesser or no vertical arms, in which case, the right, left, and rear sidewalls may serve as the vertically-positioned retainer at the right, left, and rear sides of the grate 32, while an L-shaped or other retainer bracket may be provided at the front of the charcoal platform for the vertically-positioned retainer at the front.

The bottom surface of the main body 16 may be described as the body footing or base 22, for example, comprising strips extending along the bottom right, left and rear of main body 16. The strips of body base 22 preferably extend horizontally from the right sidewall 17, left sidewall 18, and rear sidewall 19. Optionally, a body base 22 strip may be added at the front of the body 16 to extend between the right and left walls 17 and 18; if such a strip is added, however, it should be of shape and dimensions that do not block the ash platform/tray 40 insertion and removal that are detailed later in this document. At least the right and left base 22 strips, and optionally all the base 22 strips, preferably extend horizontally an amount greater than the gaps between the gas grill bars GB, so that the device 10 rests stably on top of the grill top GT without any portion of the device sliding/falling between the bars GB. However, due to the importance of having the bottom of the device substantially open and unblocked, for free and direct upward flow of heat and air/gas from the gas grill to the charcoal platform 30, the base 22 strips preferably extend horizontally an amount only slightly greater than the gaps between the gas grill bars GB, for example, the amount being 1-2 inches, more preferably 1-1.5 inches, and most preferably 1-1.25 inches. Thus, the bottom opening OB preferably extends 80-99 percent, 90-99 percent, or 95-99 percent, across the width and depth of the bottom end of the main body, resulting in the bottom of the main body and device being, 80-99 percent, 90-99 percent, or preferably 95-99 percent open. Further, the bottom opening OB preferably is sized about the same as the charcoal grate 32, for example 90-110 percent, and more preferably 95-105 percent of both the width and depth of the grate 32.

Alternatively, other base/footings may be used in certain embodiments, but base/footings are preferred that comprise continuous or substantially-continuous horizontal base surfaces along the bottom of at least two sides of the device, or more preferably at least 3 sides of the device. Extremely narrow or small-diameter feet are not desirable and preferably not included as a base for the device, as such feet will be likely to slide/fall between gas grill bars GB.

A movable/slidable ash platform is provided for catching charcoal ashes CA. In certain embodiments, the ash platform may comprise or consist essentially of a plate and one or more handles/grips at the front edge of the plate for use in inserting and removing the plate into the ash platform location in the device. In certain other, preferred embodiments, the ash platform may comprise or consist essentially of a plate and an upending rim or other vertical barrier at or near the plate edges to help contain the ashes/embers on the plate, and one or more handles/grips at or near the front edge of the plate for use in inserting and removing the plate into/from the ash platform location in the device. The ash platform of FIGS. 1-12 is of the latter embodiment type and may be described as an ash tray 40 comprising handles 44, a horizontal bottom tray plate 46, and an upending rim 48 on all four sides of tray plate 46. Ash tray 40 slidably engages/ cooperates with an ash tray support system that comprises main body base 22 strips/feet that are along the bottom right, left and rear of main body 16. Ash tray 40 slides into the interior space of the device 10 by sliding on/above top of the base 22 strips. This way, the top surface(s) of the main base 22 serve a dual-purpose, that is, as a support system for the ash tray 40 and as feet/footing for resting on the gas grill top GT, as described above. Ash tray 40 is preferably about 1.5 inches in height, including the upending rim 48, and slides into the slot/space located between the top surface(s) of the main base 22 and the bottom surface of the charcoal platform 30, that is, the bottom surfaces of the support system 28 and the grate 32. Therefore, the ash tray 40 is provided underneath the charcoal tray and at or very near the bottom plane of the device, and the charcoal platform 30 is provided in a space extending from about 1.75 to about 2.5 inches from said bottom plane. The removal of the ash tray is important in certain steps of the preferred methods of use, for reasons that are further described later in the Example Use of Device 10 section.

At or near the top of the device 10, is the cooking surface of the device. The cooking surface preferably comprises one or more, rigid grill/grate cooking grill member(s) 50, 50' for supporting food F being cooked via charcoal CH. The cooking grill member(s) 50, 50' are preferably removable from the device 10 for cleaning and/or maintenance, by lifting the grill member(s) 50, 50' vertically upward. The grill member(s) 50, 50' are preferably supported by a stationary support system 58 or "support shelf" provided at/on the inner surface of all four sides of the inside perimeter of the main body 16, that is, each of the right, left and rear sidewalls 17, 18, 19, and at the inner surface of front sidewall/reinforcement 20 that spans across the front of the main body 16. Therefore, support system 58 preferably extends around the entire perimeter of the interior space of the main body.

Figure 3:
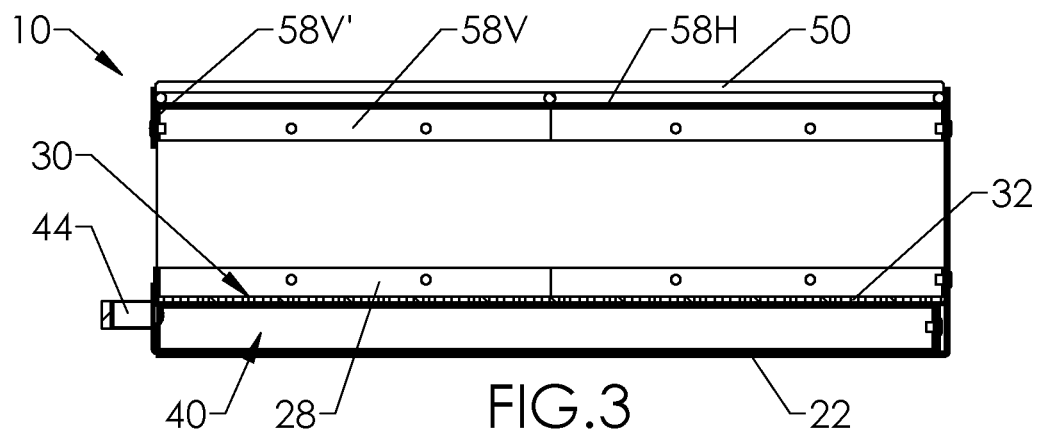
FIG. 3 is a cross-sectional view of the device viewed along the line 3-3 in FIG. 2.

The cooking grill member support system/shelf may be various structures and forms that support the grate grill member(s) 50, 50' at the desired level at/near the top of the device, including structures/forms connected to or integral with the main body and including continuous or discontinuous along one or more sidewalls of the body. One effective embodiment of the support system 58 may be made of L-shaped brackets/portions located all around the perimeter of the interior space of the main body. In FIG. 3, one may see to best advantage vertical arms 58V and horizontal arm 58H of the L-shaped left bracket/portion fixed to the left sidewall 18. In FIG. 3, one may also see the vertical arm 58V' of the L-shaped front bracket/portion fixed to the front sidewall/reinforcement 20. In FIG. 4B, one may see the horizontal arm 58H and vertical arm 58V of the L-shaped left bracket, and the horizontal arm 58H' of the L-shaped front bracket/portion fixed to the front sidewall/reinforcement 20. The preferred four horizontal arms 58H, 58H' of the system 58 are adapted to extend underneath and support the outer perimeter edges of the grill member(s) 50, 50'. The vertical arms 58V may be riveted R (FIG. 4B) or otherwise fastened to the sidewalls 17-20, for example. The horizontal arms 58H, 58H' preferably extend horizontally only about 0.5-1 inch from the sidewalls 17, 18, 19, 20 so as to not significantly block the openings/apertures through the grill member(s) 50, 50', which in the case of the preferred grill member(s) 50, 50' may be linear spaces between multiple bars FB (FIG. 4B), for example.

It may be noted that the L-shaped bracket(s)/portion(s) of the support system 58 are inverted compared to the support system 28 for the charcoal grate 32. In other words, the horizontal arms 58H, 58H' are above the vertical arms 58V that depend from horizontal arms 58H, 58H'. This inverted orientation is effective because the system 58 bracket/portions are fixed by rivets R to the sidewalls 17, 18, 19 and 20 about an inch below the top edge of the sidewalls 17-20, so that the sidewalls 17-20 extend up along the installed grill member(s) 50, 50' to horizontally surround and retain the grill member(s) 50, 50' from sliding horizontally. This way, the horizontal arms 58H, 58H' are on a horizontal plane about ¼-¾ inches, and more preferably about ½ inches, below the top edge of the main body 16, so that an upper wall portion 18' and the horizontal arms 58H, 58H' together form what may be described as a recess relative to the topmost plane of the main body. This recess receives the grill member(s) 50, 50' to place the uppermost surface(s) of the grill member(s) 50, 50' at or very near the top edge of the main body 16. In said recess, grill member(s) 50, 50' are retained by an upper wall portion 18' from sliding horizontally relative to the main body. The grill member(s) 50, 50' are preferably formed of parallel bars/rods FB, similarly to the top of a gas grill, and the weight of the grill member(s) 50, 50' also helps retain the grill member(s) 50, 50' in the recess.

Example Use of Device 10:
1) The device 10 is placed on top of the gas grill top (or gas grill grate) GT, so that the base 22 rests on the gas grill bars GB, and the front of the device 10 faces the user. The gas grill grate GT and bars GB does/do not need to be, and preferably is/are not, moved or removed for, or during, the installation and use of the device on the grill, because during lighting of the charcoal and subsequent use of the device 10 on the gas grill for cooking, the device 10 is preferably entirely, or substantially entirely, above the gas grill bars GB. Being "substantially entirely" above the gas grill bars GB means that some embodiments of the device rest on the grate GT with the base extending down at most a small distance between the bars GB, but preferably not below the lowermost plane of the bottoms of the bars GB. Therefore, the preferred device 10 does not reside, or extend, below the gas grill grate GT, and the device is unattached and unfastened to the gas grill except that it sits on top of the grate.
2) The ash tray 40 is removed from the main body 16 and set aside, preferably before said placement on the grill top GT.
3) Charcoal CH is placed on the charcoal platform 30, preferably by lifting the grill member(s) 50, 50' up to give easy access to the grate 32. This charcoal placement may be done prior to steps 1 and/or 2, or after steps 1 and 2.
4) The gas grill G is turned on by gas grill controls GC, according to conventional and safe methods for a given gas grill, and typically the gas flames are adjusted to a medium or high heat. The lid L of the grill typically will be closed to increase the heat transfer to the charcoal CH. In this ignition step/condition, the bottom of the charcoal briquettes resting on the charcoal platform 30 grate 32 is about 1.75 from the topmost surfaces of the gas grill top bars GB. The heat from the flames of the gas grill, when the gas grill is operated in a conventional manner, is sufficient to ignite the charcoal CH, for example, within 8-12 minutes, or about 10 minutes, using a "high heat" setting on the gas grill.

Thus, the preferred methods result in faster charcoal ignition than conventional methods of lighting charcoal.
5) Upon ignition of the charcoal to an extent desired by the user, the user may turn off the gas grill.

6) The user inserts the ash tray 40 into its location below the charcoal platform 30 so that any charcoal ashes fall to the tray 40.
7) The user places food to be cooked on grill member(s) 50, 50', preferably after steps 5 and 6, or less preferably before step 4 or during between steps 4 and 5.
8) The user proceeds to cook the food by means of the charcoal, with the lid L of the gas grill open, closed, or intermittently closed, as desired by the user, noting that, in this embodiment with a stationary charcoal platform, the food is about 4 inches from the charcoal briquettes and will therefore cook in a reasonable amount of time and be imparted with the traditional and desirable charcoal-grilling flavor.
9) Once the food is cooked as desired, it may be removed, and the device 10 may be left on the grill, with lid L open or closed for the charcoal to safely burn out and for the device to cool. After cooling, the ash tray 40 may be removed for disposal of the charcoal/ashes.

Detailed Description of Charcoal Grill Accessory Device 100:

FIGS. 13-24 illustrate an alternative embodiment, grilling device 100 that includes many of the same or similar structures as device 10. The structures that are the same/similar will be apparent to one viewing the drawings and reading the description of device 10. The structures adapted for increased effectiveness or convenience as will be apparent from the following discussion and may be summarized as follows: 1) the charcoal platform is removable, and adjustable in position between multiple levels relative to the food grilling members, that is, between a lower position A and a higher position B (see FIGS. 17, and 18A and B); and the ash platform is provided in position C below the lower charcoal platform position A, but spaced from the base/footing of the device so that a space exists between the bottom surface of the ash platform and the bottommost surface of the device.

As in device 10, an important adaptation of device 100 is that main body 116 is substantially open at its bottom end, for example, 80-99 percent open, more preferably 90-99 percent open, and most preferably 95-99 percent open. In other words, the bottom opening OB at the bottom end of the main body extends 80-99 percent, more preferably 90-99 percent, and most preferably 95-99 percent, across the width and depth of the main body at the main body bottom end. When the ash platform is removed from the main body, the bottom opening OB at the bottom of the main body allows all or substantially all of the interior space S inside the main body to be in fluid communication with any heat, air, or gas flow from below the main body, without structure that significantly blocks heat convection H, that is, that significantly blocks heated air/gasses from flowing directly up from the gas grill into the interior space to reach the charcoal platform.

Grilling device 100 includes main body 116 comprising a vertical enclosure wall, or "sidewall", defining and extending around or substantially around an interior space S, the sidewall in this embodiment comprising right and left sidewalls 117, 118, rear sidewall 119, and front sidewall/reinforcement 120. The bottom surface of the main body 16 may be described as the body footing or base 122, for example, comprising strips/feet extending along the bottom right, left and rear of main body 116, and a front strip/foot 122' extending-along/reinforcing the bottom front of main body 116. Base 122 rests on the grill top GT, as discussed above regarding base 22, but preferably is spaced vertically from the ash platform and ash platform support system that are located at position/level C (FIGS. 17 and 18A and B), as will be detailed later in this document. The ash platform in this embodiment may be described as a "tray type" platform, for example, ash tray 140 cooperating with ash tray support system 168. Thus, the support system 168 and ash tray 140 are lifted preferably about 0.5 inches above the base 122, which makes insertion and removal of the ash tray 140 easier, especially any structure of the grill or table/surface that might block movement of the ash tray is in front of the base 122' housing or table structure. The space between the base 122 and the ash tray 140 also helps keep the base 122 relatively cool if there are ashes/embers in the tray 140, to protect a table/surface when the device 100 is moved away from, or used separate from, the gas grill.

Alternative base/footings may be used in certain embodiments of device 100, as discussed above for device 10.

Figure 17:
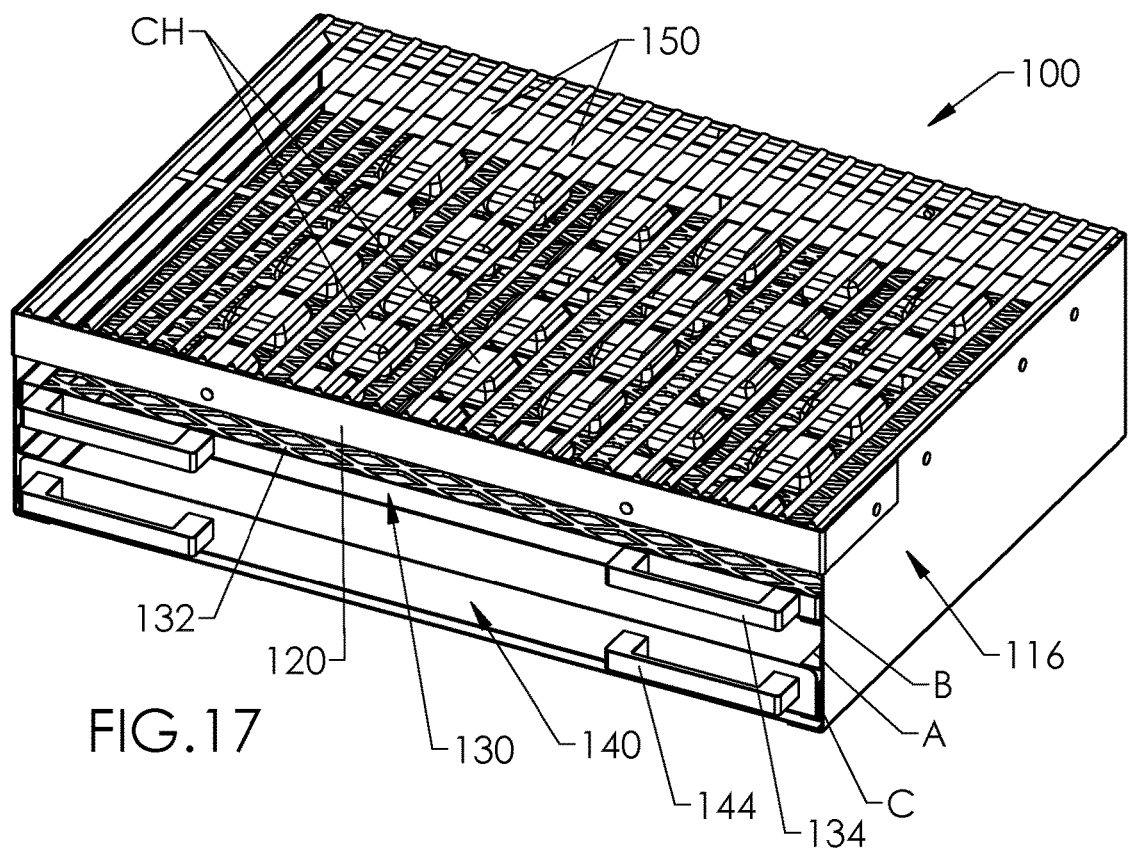
FIG. 17 is a front perspective view of the device of FIG. 13, with the charcoal platform removed from a lower position/level and inserted into a higher position/level for use closer to the top grill member(s) of the device.
Figure 18A:
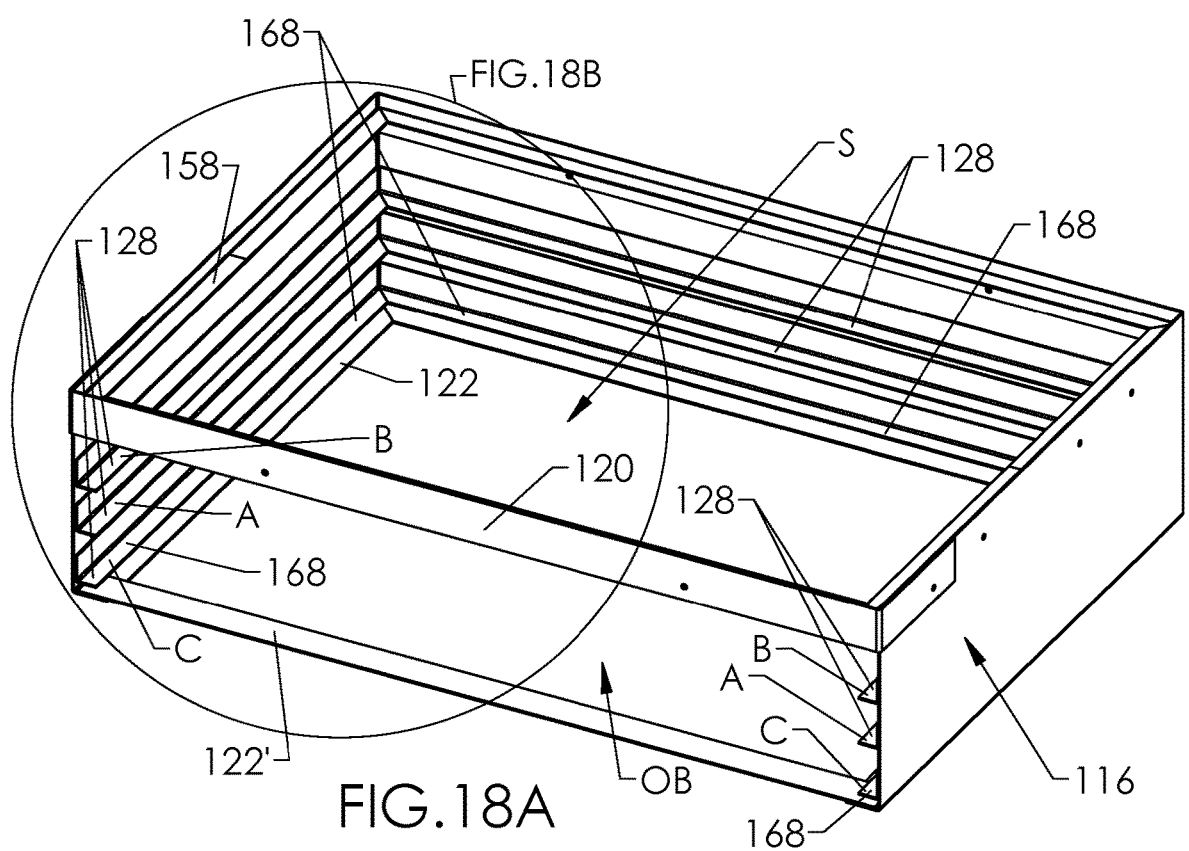
FIG. 18A is a front perspective view of the main body of the device of FIG. 13, that is, after the top grill members, the charcoal platform, and the ash tray have been removed from the main body.
Figure 18B:
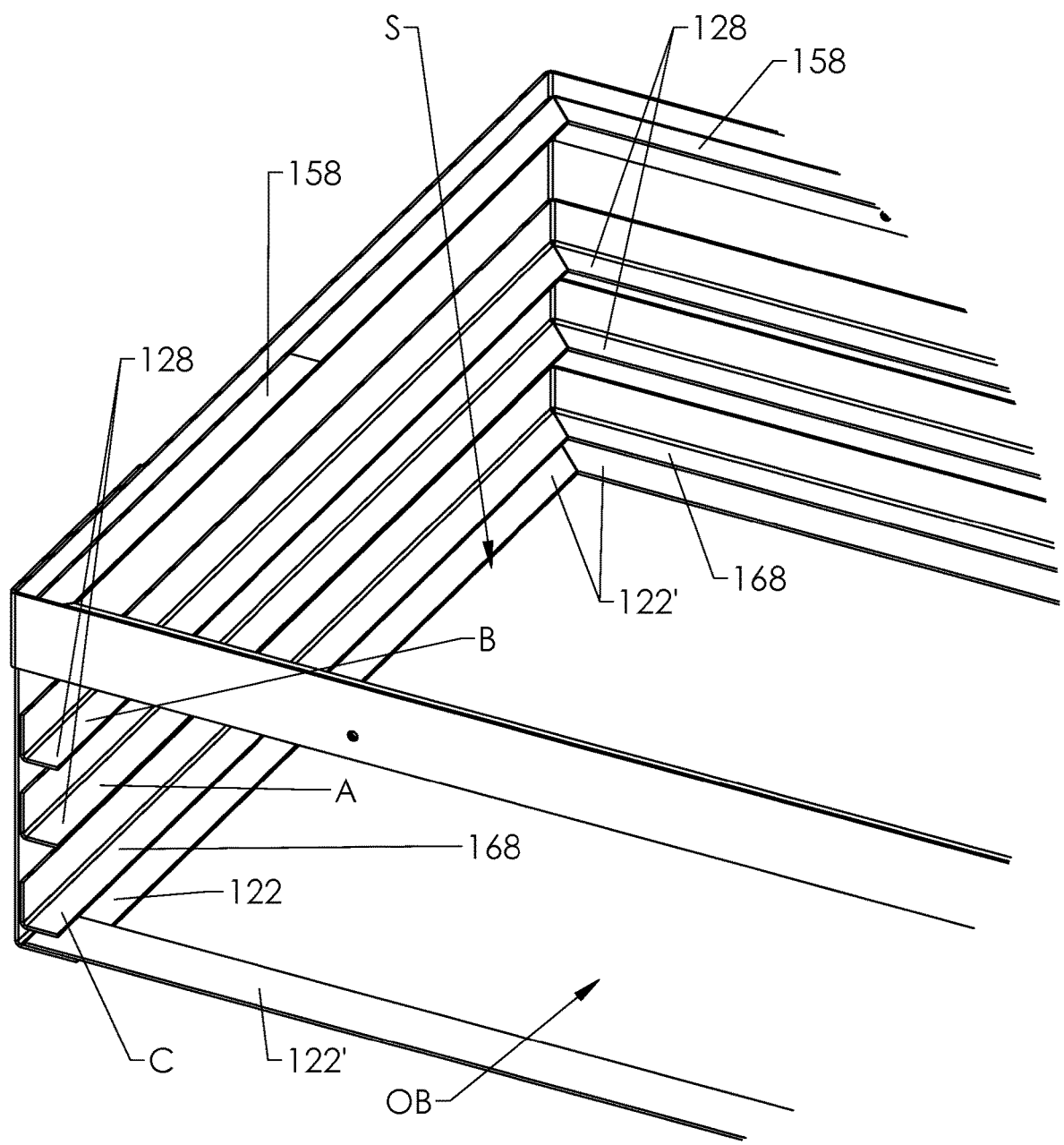
FIG. 18B is an enlarged detail view of the area circled in FIG. 18A.
Figure 19:
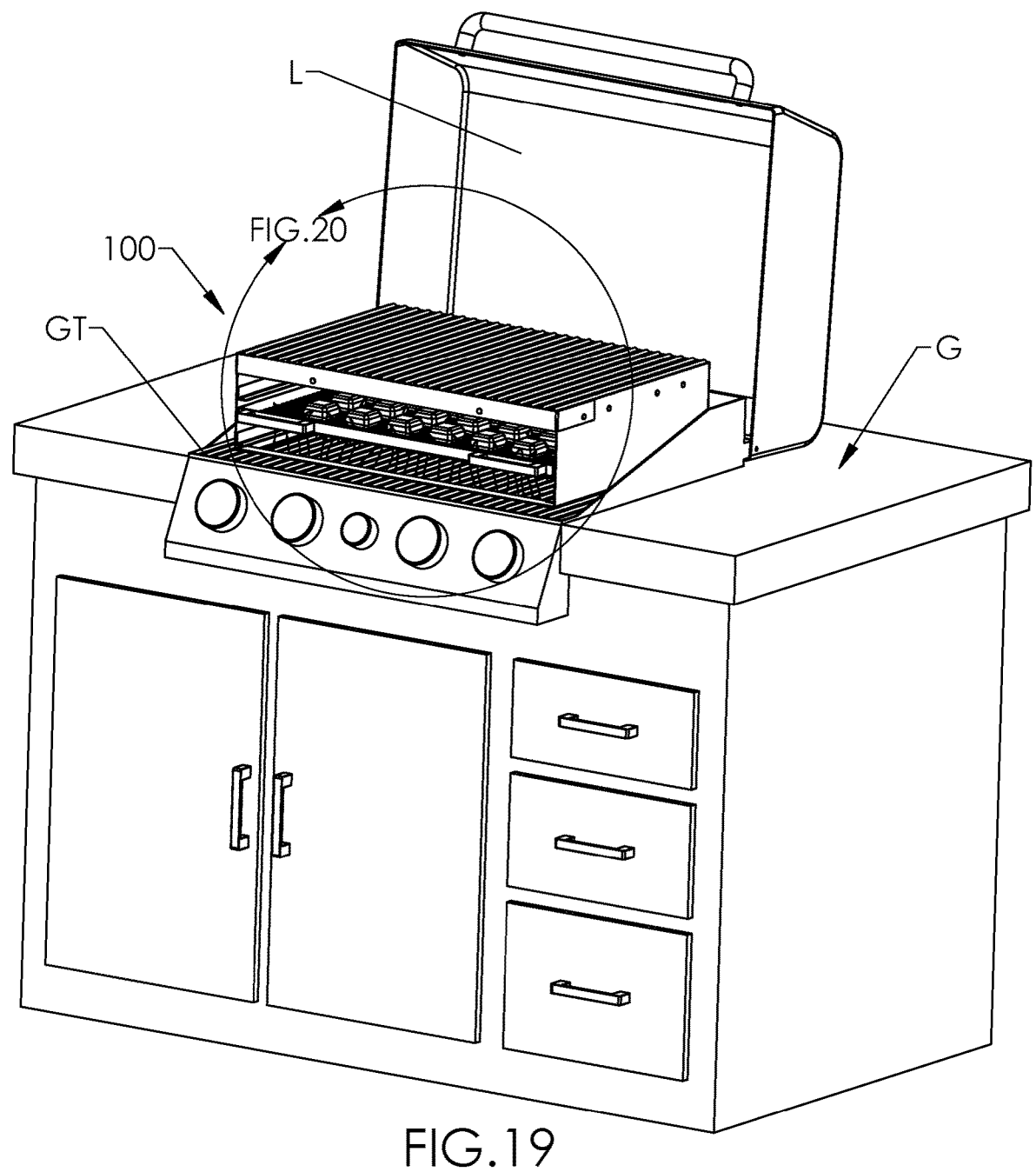
FIG. 19 is a front perspective view of the device of FIG. 13 installed on an exemplary gas grill, with charcoal installed on the charcoal platform in its lower position, the ash tray removed, the device in use during igniting of the charcoal by use of the gas grill flames/heat.
Figure 20:
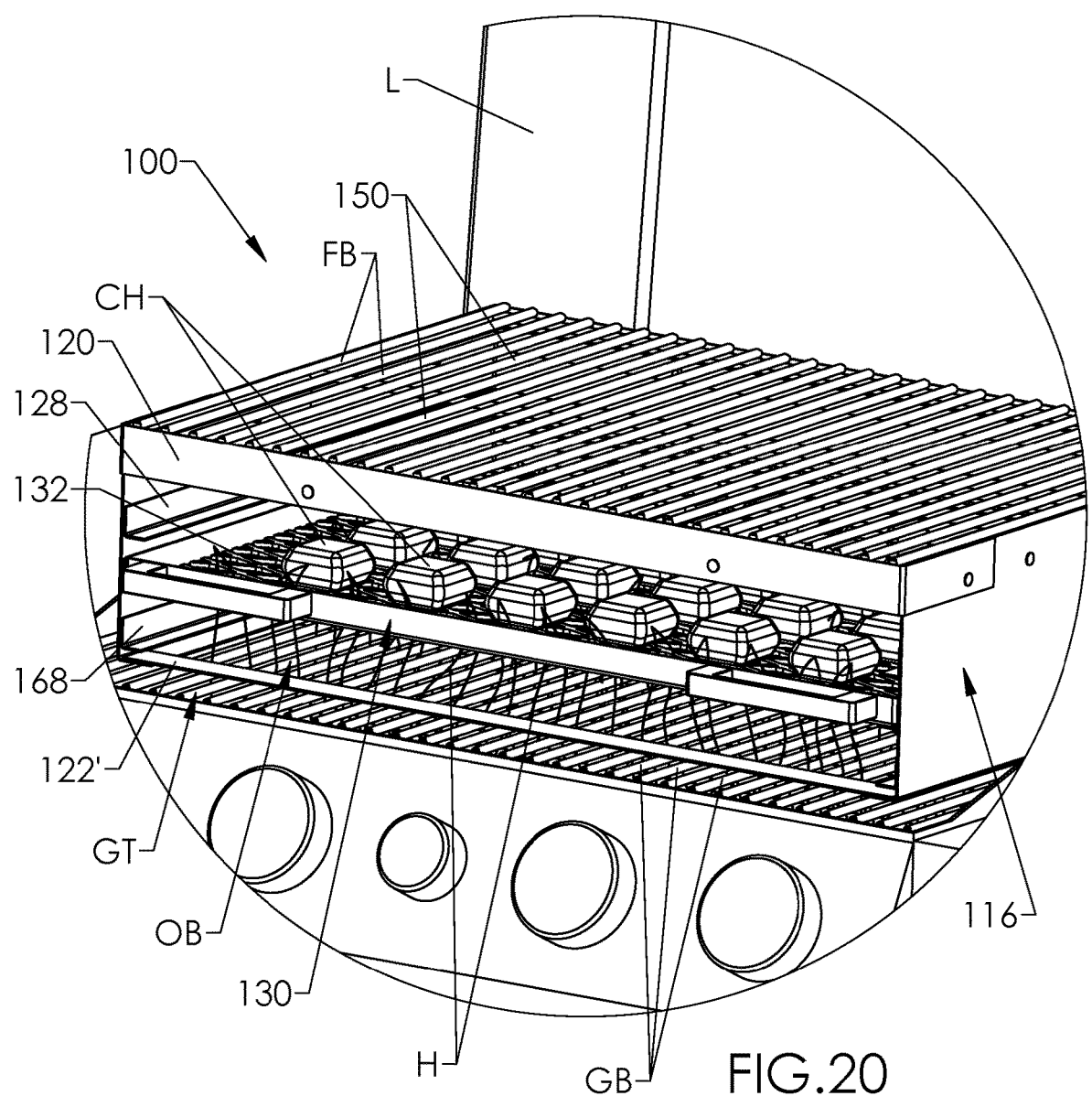
FIG. 20 is an enlarged detail view of the area circled in FIG. 19.
Figure 21:
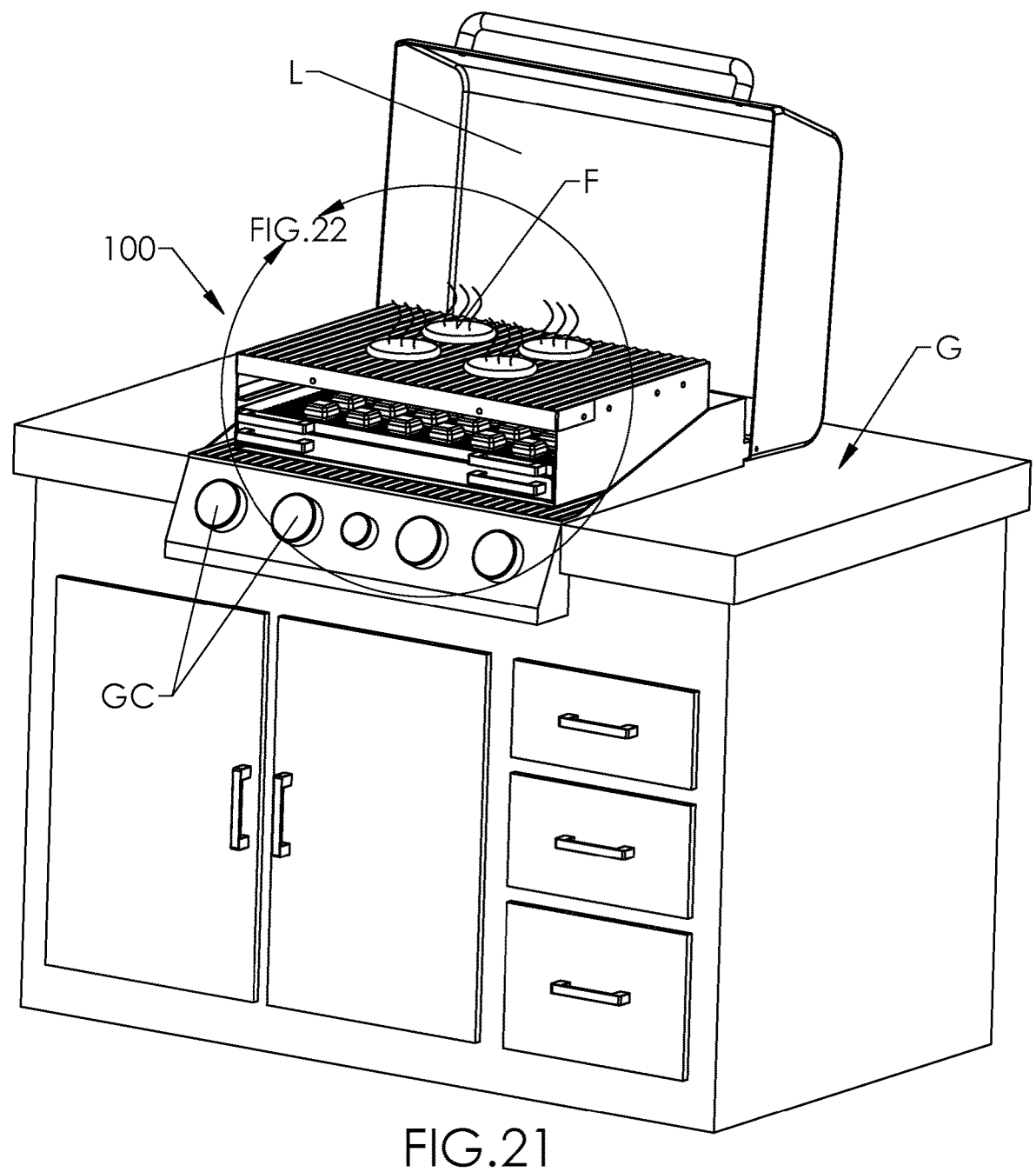
FIG. 21 is a front perspective view of the device and grill of FIG. 19, after ignition of the charcoal, with the gas grill lid open and the ash tray installed, wherein the device is in use for cooking food by means of the ignited charcoal.
Figure 22:
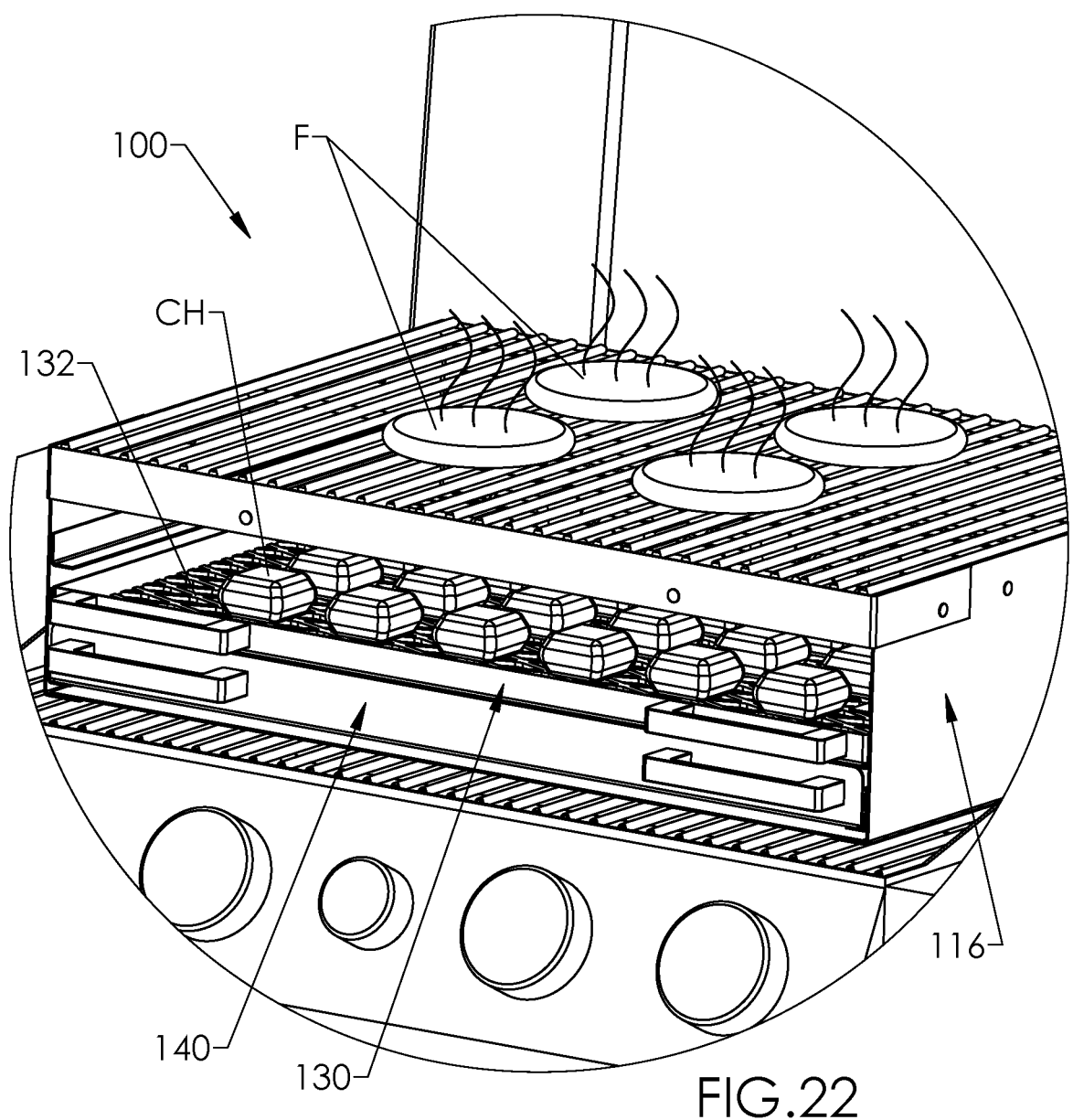
FIG. 22 is an enlarged detail view of the area circled in FIG. 21.
Figure 23:
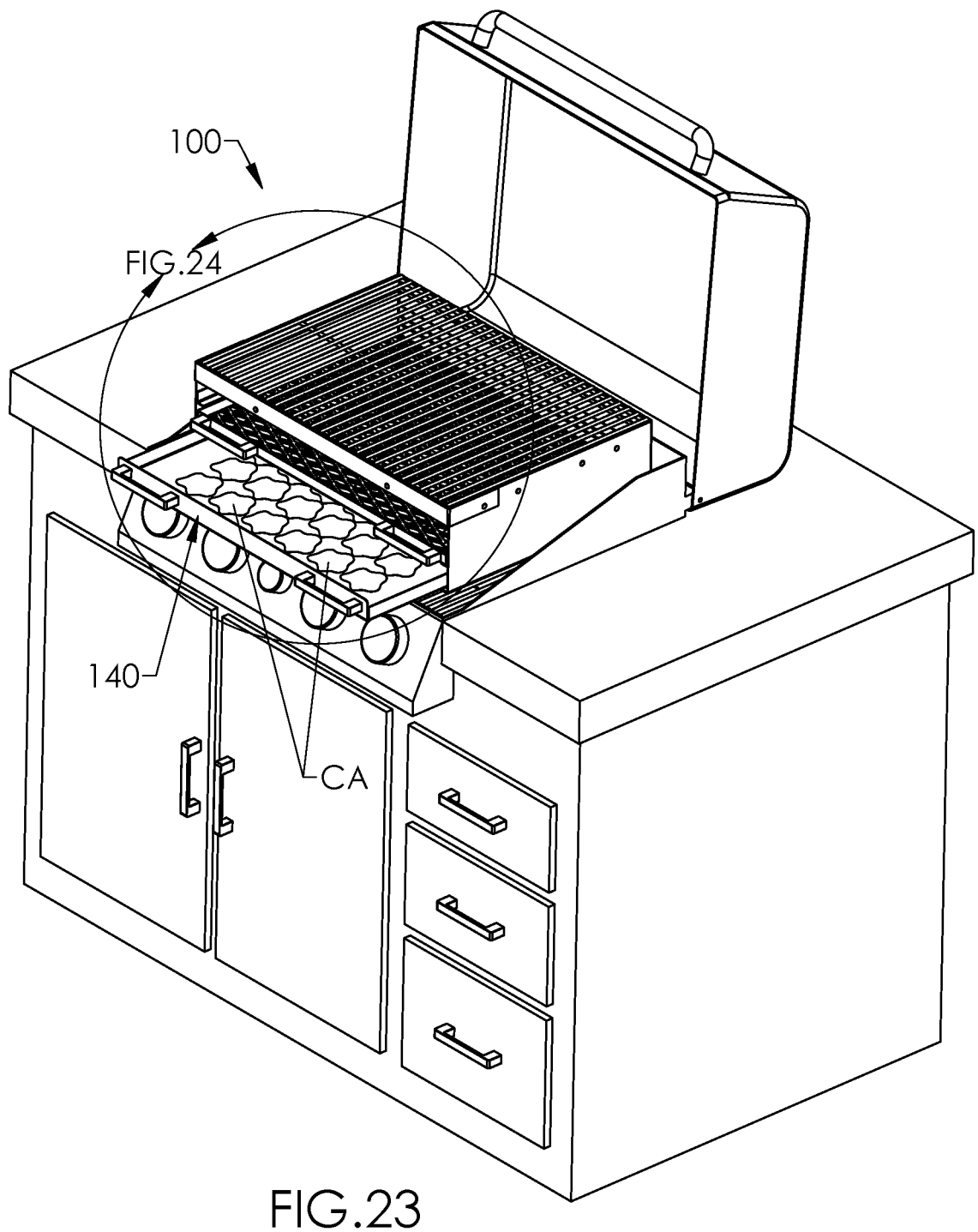
FIG. 23 is a top perspective view of the device and grill of FIG. 21, after cooking, illustrating removal of the ash tray to empty the tray of charcoal ashes.
Figure 24:
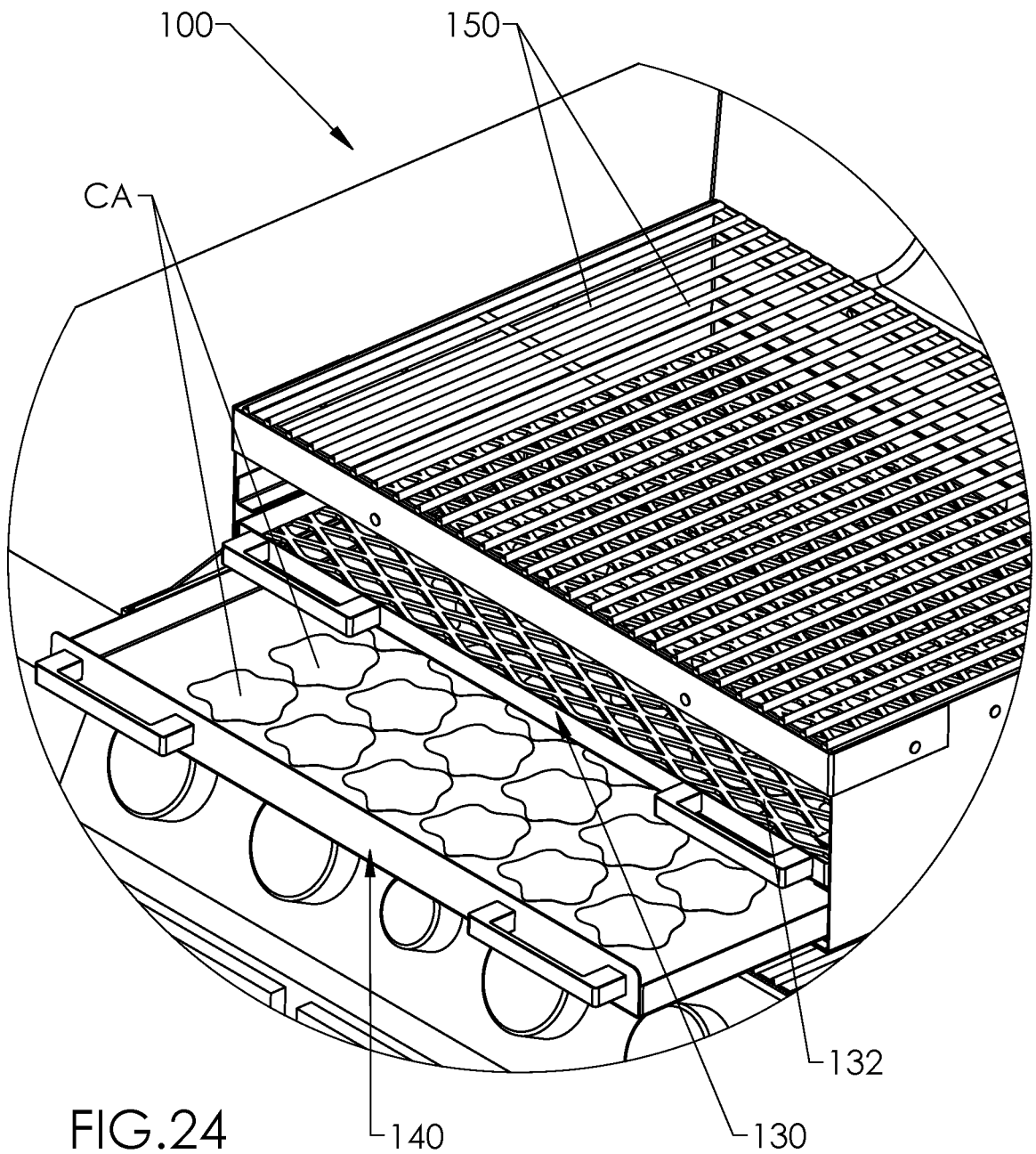
FIG. 24 is an enlarged detail view of the area circled in FIG. 23.

Movable/slidable charcoal platform 130 preferably comprises an open-bottomed charcoal tray frame 131 holding grate 132 and having handles 134, and the entire platform 130 is movable to multiple positions in the device 100. To accomplish this, platform 130 slides into any of multiple charcoal platform support systems 128 or multiple "support shelves" in the interior space of the main body 116, for example, at lower level A and higher level B (FIGS. 17 and 18A and B). Each support system 128 slidably moveably/slidably receives the charcoal platform 130, so that the platform 130 may be adjusted in its vertical location relative to the grill member 150. The support system/shelf may be various structures and forms that support the charcoal platform 130 at various levels, including structures/forms connected to or integral with the main body and including continuous or discontinuous along one or more sidewalls of the body. One effective embodiment of the support system 128 may be made of L-shaped brackets/portions L-shaped brackets/portions, located preferably around three sides (right, left and rear) of the perimeter of the interior space of the main body, leaving the front side of the support system open. In the embodiment drawn in FIGS. 13-24, there are two support systems 128, spaced apart vertically about 2 inches. The lower of the two systems 128 is very near the installed ash tray 140 at level/position A, and the higher of the two systems 128 is at level/position B, which is closer to the grill member 150 and about midway between the ash tray 140 and the grill members 150. This way, the charcoal CH is adjustable to different levels for cooking. The spacing and level of the two support systems 128 (A and B, FIGS. 17 and 18A and B) above the base 122 (and therefore above the grill top GT) are preferably chosen so that the charcoal CH will ignite when the charcoal tray 130 is installed at either of the two locations, but the higher level B of the two levels may require a higher gas flame setting and/or longer time for ignition than the lower level A. To prevent having to move the charcoal platform 130 from the lower location (where ignition may be faster) to the upper location for certain foods or cooking styles, it is preferable that the charcoal platform 130 be installed prior to ignition at the level preferred for food to be cooked and/or the preferred cooking style, so that both ignition and cooking may be conducted without having to move the platform 130 to different level/positions.

Moveable/slidable ash tray 140, for catching charcoal ashes CA, may be the same or similar as the tray 40 described above for device 10, for example, comprising handles 144, bottom tray plate 146, and upending rim 148 around all four sides of plate 146. The tray 140 moves/slides in and out of the main body by moving/sliding above and/or along ash tray support system/shelf 168 in position/level C (FIGS. 17 and 18A and B). The support system/shelf 168 may be various structures and forms that support the ash tray 140 at the desired level, including structures/forms connected to or integral with the main body and including continuous or discontinuous along one or more sidewalls of the body. One effective embodiment of support system 168 for tray 140 may be a three-sided support system (right, left and rear, leaving the front side open) that is the same or similar to the support systems 128, except that support system 168 is preferably located below, and spaced from, the charcoal platform support systems 128 and also located above, and spaced about 0.5 inches from, the main body base 122.

As in device 10, the grill member(s) 150 are provided and supported at the desired cooking level at/near the top of the device. The support system 158 and grill member(s) 150 may be the same or similar to those described for device 10, preferably positioning the grill member(s) 150 in a "recess" defined by upper portions of the sidewalls and the horizontal surface(s) of brackets/portions of the support system 158 as described above for device 10.

Device 100 is adapted for use with a conventional gas grill G, as described above for device 10, and as further detailed below in the Example Use of Device 100 section. For use with conventional gas grills, the base 122 of the main body 116 preferably extends horizontally an amount greater than the gaps between the gas grill bars GB, so that the device 100 rests stably on top of the grill top GT without any portion of the device sliding/falling between the bars GB. However, due to the importance of having the bottom of the device substantially open and unblocked, for free and direct upward flow of heat and air/gas from the gas grill to the charcoal platform 130, the base 122, 122' strips preferably extend horizontally an amount only slightly greater than the gaps between the gas grill bars GB, for example, the amount being 1-2 inches, more preferably 1-1.5 inches, and most preferably 1-1.25 inches. Thus, the bottom opening OB preferably extends 80-99 percent, 90-99 percent, or 95-99 percent, across the width and depth of the bottom end of the main body 116, resulting in the bottom of the main body and device being, 80-99 percent, 90-99 percent, or preferably 95-99 percent open. Further, the bottom opening OB preferably is sized about the same as the charcoal grate 132, for example 90-110 percent, and more preferably 95-105 percent of both the width and depth of the grate 132.

Example Use of Device 100:
1) The device 100 is placed on top of the gas grill top (gas grill grate) GT, so that the base 122 rests on the gas grill bars GB, and the front of the device 100 faces the user. The gas grill grate GT and bars GB does/do not need to be, and preferably is/are not, moved or removed for, or during, the installation and use of the device on the grill, because during lighting of the charcoal and subsequent use of the device 100 on the gas grill for cooking, the device 100 is preferably entirely, or substantially entirely, above the gas grill bars GB. Being "substantially entirely" above the gas grill bars GB means that some embodiments of the device rest on the grate GT with the base extending down at most a small distance between the bars GB, but preferably not below the lowermost plane of the bottoms of the bars GB. Therefore, the preferred device 100 does not reside, or extend, below the gas grill grate GT, and the device is unattached and unfastened to the gas grill except that it sits on top of the grate.
2) The ash tray 140 is removed from the main body 116 and set aside, before, or optionally after, said placement on the grill top GT.
3) The charcoal platform 130 is placed in the desirable level in the main body 116, that is, the lower or the upper support system, depending on whether the user wants the charcoal to cook food from a position farther or closer to the food, respectively. Charcoal CH is placed on the charcoal platform 130, either by inserting the charcoal horizontally onto the platform 130, or by lifting the grill member(s) 150 up to give easy access to the grate 132. Typically, the charcoal CH is placed in a single layer on the grate 132 to maximize heat transfer to each briquette in a given amount of time. This charcoal placement may be done prior to steps 1 and/or 2, or after steps 1 and 2.
4) The gas grill G is turned on by the gas grill controls GC, according to conventional and safe methods for a given gas grill, and typically the gas flames are adjusted to a medium or high heat. The lid L of the grill typically will closed to increase the heat transfer to the charcoal CH. In this ignition step/condition, the bottom of the charcoal briquettes resting on the preferred charcoal platform 130 grate 132, in the lower position, is about 2 inches from the topmost surfaces of the grill top bars GB (and about 4 inches from the top surfaces of the grill member(s) bars FB on which the food is cooked), or, in the upper position, about 4 inches from the topmost surfaces of the grill top bars GB (and about 2 inches from the top surfaces of the grill member(s) bars FB). In either case, the heat from the flames of the gas grill, when the gas grill is operated in a conventional manner, is sufficient to ignite the charcoal CH, for example, within 7-15 minutes, or 8-12 minutes, or about 10 minutes, using a "high heat" setting on the gas grill. Thus, the preferred methods result in faster charcoal ignition than conventional methods of lighting charcoal.
5) Upon ignition of the charcoal, to an extent desired by the user, the user may turn off the gas grill.
6) The user inserts the ash tray 140 into its location below the charcoal platform 130 so that any charcoal ashes fall to the tray 140.
7) The user places food to be cooked on grill member(s) 150 preferably after steps 5 and 6, or less preferably before step 4 or during between steps 4 and 5.
8) The user proceeds to cook the food by means of the charcoal, with the lid L of the gas grill open, closed, or intermittently closed, as desired by the user, noting that, in this embodiment with an adjustable charcoal platform, the food is about 2 or 4 inches from the charcoal briquettes and will therefore cook in a reasonable amount of time and be imparted with the traditional and desirable charcoal-grilling flavor.
9) Once the food is cooked as desired, it may be removed, and the device 100 may be left on the grill, with lid L open or closed for the charcoal to safely burn out and for the device to cool. After the charcoal/ashes are cool, the ash tray 140 may be removed for disposal of the charcoal/ashes.

In the Summary of the Invention above, throughout the Detailed Description, and in the accompanying drawings, reference is made to particular features, including method steps, of certain embodiments of the invention. It is to be understood that the disclosure of the invention in this specification includes all possible and effective combinations of such particular features. For example, where a particular feature is disclosed in the context of a particular aspect, a particular embodiment, or a particular Figure, that feature can also be used, to the extent appropriate and effective, in the context of other particular aspects, embodiments, and Figures, and in the invention generally.

Although this invention has been described above with reference to particular means, materials and embodiments, it is to be understood that the invention is not limited to these disclosed particulars, but extends instead to all equivalents within the scope of the following claims.

We claim:

1. A system comprising a gas grill and a charcoal grill accessory device for grilling with charcoal:
   the gas grill having a gas grill cooking grate, the gas grill being adapted to produce gas-fueled flames that produce heat that rises through and above the gas grill cooking grate, wherein the gas grill cooking grate is positioned for supporting food on top of the gas grill cooking grate for cooking of the food by said heat that rises through and above the gas grill cooking grate; and
   the charcoal grill accessory device resting on top of the gas grill cooking grate and comprising:
   a main body having a top end and a bottom end, and the main body comprising a sidewall surrounding and defining an interior space of the device, wherein a front side of the sidewall comprises multiple front openings into the interior space;
   at least one charcoal cooking grill member connected to the sidewall at or near a top edge of the sidewall, for supporting food on top of the at least one charcoal cooking grill member to be cooked by burning charcoal;
   a charcoal platform extending across the interior space between the at least one charcoal cooking grill member and the bottom end of the main body, and the charcoal platform having a charcoal grate for supporting charcoal and comprising multiple apertures extending vertically through the charcoal grate;
   the main body bottom end comprising a base resting on top of the gas grill cooking grate, the base comprising a bottom opening through which said heat rises into the interior space of the charcoal grill accessory device and to the charcoal platform, so that said heat passes through said multiple apertures of the charcoal grate to contact the charcoal on the charcoal grate to ignite the charcoal; and
   wherein the charcoal grill accessory device further comprises an ash platform that is insertable through a lower of said multiple front openings to an ash platform location in the interior of the main body that is below the charcoal platform;
   wherein, after ignition of the charcoal, the gas grill is turned off and the ash platform is inserted into said ash platform location so that the ash platform catches charcoal ashes that fall through said multiple apertures of the charcoal grate to the ash platform while the charcoal is used to cook food on top of said at least one charcoal cooking grill member of the device; and
   wherein all of the ash platform, the charcoal platform, and the at least one charcoal cooking grill member are above the gas grill cooking grate.

2. The system as in claim 1, wherein the main body has a bottom width and a bottom depth, and the bottom opening extends horizontally across 80-99 percent of each of the bottom width and bottom depth of the main body.

3. The system as in claim 2, wherein the charcoal grate has a width and a depth, and the bottom opening is 90-110 percent of each of said width and depth of said charcoal grate.

4. The system as in claim 1, wherein no part of the charcoal grill accessory device resides, or extends, under the gas grill cooking grate.

5. The system of claim 1, wherein the charcoal platform is moveable to multiple levels in the interior space of the charcoal grill accessory device by sliding the charcoal platform into multiple support systems extending from the sidewall into the interior space at levels between the at least one charcoal cooking grill member and the ash platform location.

6. The system of claim 1, wherein the ash platform is an ash tray comprising a horizontal plate and a perimeter rim upending from the plate.

7. A method of using a charcoal grill accessory device with a gas grill, the method comprising:
   providing a charcoal grill accessory device comprising:
   a main body having a top end and a bottom end with a bottom width and a bottom depth, the main body comprising a sidewall surrounding and defining an interior space of the charcoal grill accessory device, wherein a front side of the sidewall comprises multiple front openings into the interior space, and the main body comprises a base at the bottom end that has a bottom opening that extends horizontally across 80-99 percent of the bottom width and bottom depth of the main body;
   at least one charcoal cooking grill member connected to the sidewall at or near a top edge of the sidewall, for receiving food on top of said charcoal cooking grill member to be cooked by charcoal;
   a charcoal platform extending across the interior space between the at least one charcoal-cooking grill member and the bottom end of the main body, and the charcoal platform having a charcoal grate for supporting charcoal and comprising multiple apertures extending vertically through the grate;
   an ash platform that is insertable through a lower of said multiple front openings to an ash platform location in the interior of the main body that is below the charcoal platform; and providing a gas grill comprising a gas grill cooking grate for supporting food to be cooked by heat that rises from gas-fueled flames produced by the gas grill;
   the method further comprising:
   resting the charcoal grill accessory device on top of the gas grill cooking grate, so the base rests on top of the gas grill cooking grate and all of the ash platform, the charcoal platform, and the at least one charcoal cooking grill member are above the gas grill cooking grate, and, prior to or after said resting, removing the ash platform from the ash platform location and placing charcoal on said charcoal platform;
   operating the gas grill to produce said heat rising from gas-fueled flames that rises up to, through, and above, the gas grill cooking grate, through said bottom opening of the charcoal grill accessory device into the interior space and through said multiple apertures of the charcoal grate to contact and ignite the charcoal on the charcoal grate, so that the charcoal burns to produce charcoal-produced heat that rises from the charcoal through the at least one charcoal-cooking grill member;
   after ignition of the charcoal, turning off the gas grill and inserting the ash platform into said location so that the ash platform catches charcoal ashes that fall through said multiple apertures of the grate to the ash platform; and
   using the charcoal-produced heat to cook food placed on top of the at least one charcoal-cooking grill member.

8. The method as in claim 7, wherein the charcoal grate has a width and a depth, and the bottom opening is 90-110 percent of each of said width and depth of said charcoal grate.

9. The method as in claim 7, wherein no part of the charcoal grill accessory device is placed under the gas grill cooking grate.

10. The method of claim 7, wherein, prior to operating the gas grill, the method comprises adjusting the charcoal platform to one of multiple levels inside the interior space to be closer or farther from the at least one charcoal-cooking grill member, and wherein the charcoal ignites when in any of said multiple levels when the gas grill is turned on and the ash platform is not in said ash platform location.

11. The method of claim 7, wherein the gas grill heats the charcoal to ignite the charcoal, and the gas grill is not used to cook the food on the at least one charcoal-cooking grill member.

12. The system as in claim 1, wherein the charcoal grill accessory device is not fastened to the gas grill so that the charcoal grill accessory device is movable from the gas grill to a table or other surface for charcoal-only cooking of the food on top of said at least one charcoal cooking grill member to proceed.

13. The system as in claim 1, wherein the main body is rectangular and comprises a right sidewall, a left sidewall, and a rear sidewall, and the charcoal grate is rectangular and the charcoal grate has a width and a depth, the gas grill cooking grate comprises bars spaced apart to form gaps between the bars, and the base of the main body bottom end comprises horizontal strips that extend along the right sidewall, the left sidewall, and the rear sidewall, wherein the horizontal strips extend horizontally an amount greater than the gaps between the bars and in the range of 1-2 inches, so that the accessory device rests stably on top of the gas grill cooking grate without any portion of the accessory device sliding or falling between the bars, and so that the bottom opening is 90-110 percent of the width and the depth of the charcoal grate.

14. The method as in claim 7, wherein the charcoal grill accessory device is not fastened to the gas grill, and wherein, after said ignition of the charcoal and after said inserting of the ash platform, the charcoal grill accessory device is moved from the gas grill to a table or other surface for said using the charcoal-produced heat to cook the food.

15. The system as in claim 7, wherein the main body is rectangular and comprises a right sidewall, a left sidewall, and a rear sidewall, and the charcoal grate is rectangular and the charcoal grate has a width and a depth, the gas grill cooking grate comprises bars spaced apart to form gaps between the bars, and the base of the main body bottom end comprises horizontal strips that extend along the right sidewall, the left sidewall, and the rear sidewall, wherein the horizontal strips extend horizontally an amount greater than the gaps between the bars and in the range of 1-2 inches, so that the accessory device rests stably on top of the gas grill cooking grate without any portion of the accessory device sliding or falling between the bars, and so that the bottom opening is 90-110 percent of the width and the depth of the charcoal grate.

* * * * *